(12) United States Patent
Monson et al.

(10) Patent No.: US 12,032,801 B2
(45) Date of Patent: *Jul. 9, 2024

(54) ADJUSTING CURSOR SPEED

(71) Applicant: Cirque Corporation, Sandy, UT (US)

(72) Inventors: Brian Monson, Farmington, UT (US); Todd Rich, Riverton, UT (US); Steven Varrato, South Jordan, UT (US)

(73) Assignee: Cirque Corporation, Sandy, UT (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/083,777

(22) Filed: Dec. 19, 2022

(65) Prior Publication Data

US 2023/0185424 A1 Jun. 15, 2023

Related U.S. Application Data

(63) Continuation-in-part of application No. 17/533,334, filed on Nov. 23, 2021, now Pat. No. 11,561,629.

(51) Int. Cl.
*G09G 5/00* (2006.01)
*G06F 3/0354* (2013.01)
*G06F 3/04812* (2022.01)

(52) U.S. Cl.
CPC ...... *G06F 3/04812* (2013.01); *G06F 3/03547* (2013.01)

(58) Field of Classification Search
CPC ...... G06F 1/169; G06F 3/03547; G06F 3/038; G06F 3/041; G06F 3/0416; G06F 3/044; G06F 3/0446; G06F 3/04812; G06F 3/0482; G06F 3/04847; G06F 3/04883; G06F 2203/04107; G06F 2203/04108

See application file for complete search history.

(56) References Cited

U.S. PATENT DOCUMENTS

| | | | | |
|---|---|---|---|---|
| 5,543,591 | A | * | 8/1996 | Gillespie ............. G06F 3/04883 341/33 |
| 6,204,839 | B1 | * | 3/2001 | Mato, Jr. .............. H03K 17/975 345/157 |
| 7,400,318 | B2 | | 7/2008 | Gerpheide |
| RE46,317 | E | | 2/2017 | Seguine |
| 11,561,629 | B1 | * | 1/2023 | Monson ................ G06F 1/1662 |
| 2005/0057489 | A1 | * | 3/2005 | Kung ..................... G06F 1/1616 345/156 |
| 2005/0259086 | A1 | * | 11/2005 | Chiu ....................... G06F 3/044 345/173 |
| 2008/0048997 | A1 | * | 2/2008 | Gillespie ............... G06V 40/20 345/174 |
| 2009/0262086 | A1 | * | 10/2009 | Chen ..................... G06F 3/0488 345/173 |

(Continued)

*Primary Examiner* — Joe H Cheng

(57) ABSTRACT

Adjusting a cursor speed may include a sensor with at least one capacitance sense electrode, a controller in communication with the sensor, memory in communication with the controller, and programmed instructions stored in the memory and configured, when executed, to cause the capacitance controller to detect movement of an object moving proximate the sensor at an object speed, apply a cursor speed to a cursor depicted in a display based at least in part on a cursor-to-object speed relationship, detect a trigger event in the detected object movement, and change the cursor-to-object speed relationship in response to detecting the trigger event.

20 Claims, 25 Drawing Sheets

(56) References Cited

U.S. PATENT DOCUMENTS

| | | | | |
|---|---|---|---|---|
| 2010/0177041 A1* | 7/2010 | Chen | ............... | G06F 3/038 |
| | | | | 345/163 |
| 2010/0177042 A1* | 7/2010 | Chen | ............... | G06F 3/03547 |
| | | | | 345/159 |
| 2014/0028555 A1* | 1/2014 | Oh | ............... | G06F 3/03547 |
| | | | | 345/158 |
| 2015/0169095 A1* | 6/2015 | Nishitani | ............... | G06F 3/041 |
| | | | | 345/173 |
| 2016/0062470 A1* | 3/2016 | Pandey | ............... | G06F 3/017 |
| | | | | 702/150 |
| 2016/0334912 A1* | 11/2016 | Protasio Ribeiro | ... | G06F 3/0488 |
| 2021/0034166 A1* | 2/2021 | Monson | ............... | G06F 3/0446 |

\* cited by examiner

| Scrubbing Event Threshold | Back Tracking Event Threshold |
|---|---|
| 4 | 2 |

1100 → (left cell), 1102 → (right cell)

| Back Tracking Event Distance 1 | Back Tracking Event Distance 2 | Back Tracking Event Distance 3 | Back Tracking Event Distance 4 | Average Back Tracking Distance |
|---|---|---|---|---|
| 3 | 2 | 2 | 3 | 2.5 |

Fig. 12

ADJUSTING CURSOR SPEED

RELATED APPLICATIONS

"The present Application is a continuation-in-part of U.S. patent application Ser. No. 17/533,334 issued to Brian Monson., entitled "Adjusting Cursor Speed," filed on Nov. 23, 2021, now U.S. Pat. No. 11,561,629 B1, the disclosure of which is incorporated by reference."

FIELD OF THE DISCLOSURE

This disclosure relates generally to systems and methods for adjusting a cursor speed. In particular, this disclosure relates to systems and methods for adjusting a cursor speed in response to detecting a trigger event.

BACKGROUND

A touch pad is often incorporated into laptops and other devices to provide a mechanism for giving inputs to the device. For example, a touch pad may be positioned adjacent to a keyboard in a laptop and include a surface that can be touched by the user. Touch pads may operate using capacitive sensing, a technology that senses the change of capacitance where a finger touches the pad. In some examples, the moving a finger, stylus, or another type of object adjacent or on the touch pad may cause a cursor to move on a display in communication with the touch pad.

An example of a touch pad is disclosed in U.S. Pat. No. 7,400,318 issued to George Gerpheide, et al. This reference discloses a touch pad and measurement circuitry for enabling input to a computer or other electronic device. The system includes an X electrode, a Y electrode, a common sensing electrode, and a "water" electrode, wherein these four separate electrodes can be implemented in various physical configurations to obtain the desired effects, wherein moisture and water droplets can be identified and compensated for so as not to interfere with the input of data, wherein noise rejection is achieved by using a time aperture filtering method, wherein an improved scanning technique focuses scanning around an identified input object, wherein an adaptive motion filter responds to the speed and acceleration of an object being tracked, and wherein the measurement circuitry has an increased dynamic range enabling the touch pad to operate with greater tolerances to manufacturing variances. This reference is herein incorporated by reference for all that it contains.

SUMMARY

In one embodiment, a system for adjusting a cursor speed may include a sensor with at least one capacitance sense electrode, a controller in communication with the sensor, memory in communication with the controller, and programmed instructions stored in the memory and configured, when executed, to cause the capacitance controller to detect movement of an object moving proximate the sensor at an object speed, apply a cursor speed to a cursor depicted in a display based at least in part on a cursor-to-object speed relationship, detect a trigger event in the detected object movement, and change the cursor-to-object speed relationship in response to detecting the trigger event The cursor-to-object speed relationship may include at least a lower object speed range and an upper object speed range where a first curser speed mapped to the lower object speed range is slower than a second cursor speed range mapped to the upper object speed range.

The trigger event may be an overshoot event.

Changing the cursor-to-object speed relationship may include lowering the second cursor speed in the upper object speed range while maintaining the first cursor speed in the lower object speed range.

The overshoot event may be a back tracking event.

Changing the cursor-to-object speed relationship in response to detecting the trigger event may include adjusting the cursor-to-object speed relationship by a factor, wherein the intensity factor is based, at least in part, on a measured overshoot distance characteristic.

The measured overshoot distance characteristic may be an average of measured overshoot distances.

The trigger event may be an undershooting event.

Changing the cursor-to-object speed relationship may include increasing the first cursor speed in the lower object speed range and increasing the second cursor speed in the upper object speed range.

Changing the cursor-to-object speed relationship may include increasing the first cursor speed in the lower object speed range and maintaining the second cursor speed in the upper object speed range.

The undershooting event may be a scrubbing event.

Changing the cursor-to-object speed relationship in response to detecting the trigger event may include detecting enough of a same type of the trigger event repeated within a predetermined amount of time to meet a repetition threshold.

In one embodiment, a method for adjusting a cursor speed may include detecting movement of an object moving proximate a touch sensor at an object speed, applying a cursor speed to a cursor depicted in a display based at least in part on a cursor-to-object speed relationship, detecting a trigger event in the detected object movement, and changing the cursor-to-object speed relationship in response to detecting the trigger event.

The cursor-to-object speed relationship may include at least a lower object speed range, and an upper object speed range where a first curser speed mapped to the lower object speed range is slower than a second cursor speed range mapped to the upper object speed range.

The trigger event may be an overshoot event.

The overshoot event may be a back tracking event.

Changing the cursor-to-object speed relationship in response to detecting the trigger event may include adjusting the cursor-to-object speed relationship by an intensity factor, wherein the intensity factor is based, at least in part, on a measured overshoot distance characteristic.

The trigger event may be an undershooting event.

The undershooting event may be a scrubbing event.

In one embodiment, a computer-program product for adjusting a cursor speed may include non-transitory computer-readable medium storing instructions executable by a processor to detect movement of an object moving proximate a touch sensor at an object speed, apply a cursor speed to a cursor depicted in a display based at least in part on a cursor-to-object speed relationship; detect a trigger event in the detected object movement; and change the cursor-to-object speed relationship in response to detecting the trigger event.

In one embodiment, a system for adjusting a cursor speed may include a sensor with at least one capacitance sense electrode, a controller in communication with the sensor, memory in communication with the controller, and programmed instructions stored in the memory and configured, when executed, to cause the capacitance controller to detect movement of an object moving proximate the sensor at an object speed, apply a cursor speed to a cursor depicted in a display based at least in part on a cursor-to-object speed relationship, detect a trigger event in the detected object movement, and change the cursor-to-object speed relationship in response to detecting the trigger event occurring in a predetermined region of the sensor.

Changing the cursor-to-object speed relationship in response to detecting the trigger event may include adjusting the cursor-to-object speed relationship by an intensity factor, wherein the intensity factor is based, at least in part, on a measured speed of an object entering the predefined region.

Changing the cursor-to-object speed relationship in response to detecting the trigger event may include adjusting the cursor-to-object speed relationship by an intensity factor, wherein the intensity factor is based, at least in part, on a measured distance traveled of an object entering the predefined region.

Changing the cursor-to-object speed relationship may include increasing the first cursor speed in the lower object speed range and increasing the second cursor speed in the upper object speed range.

Changing the cursor-to-object speed relationship may include increasing the first cursor speed in the lower object speed range and maintaining the second cursor speed in the upper object speed range.

The predefined region may be adjacent to the edge of the sensor.

The predefined region may be within 20% of the length of the sensor.

The predefined region may be within 20% of the width of the sensor.

The predefined region may be adjacent to the edge of the sensor and the central region is outside of the predefined region.

The trigger event may include detecting movement of an object from outside of the predefined region into the predefined region.

The trigger event may include detecting the object lift off the sensor within the predefined region.

The trigger event may include detecting the object move across more than 50% of the sensor.

Changing the cursor-to-object speed relationship may include sending a user prompt to change the cursor speed.

In one embodiment, a computer-program product for adjusting a cursor speed may include non-transitory computer-readable medium storing instructions executable by a processor to detect movement of an object moving proximate a touch sensor at an object speed, apply a cursor speed to a cursor depicted in a display based at least in part on a cursor-to-object speed relationship; detect a trigger event in the detected object movement; and change the cursor-to-object speed relationship in response to detecting the trigger event in a predefined region.

The predefined region may be adjacent to the edge of the sensor.

Changing the cursor-to-object speed relationship in response to detecting the trigger event may include detecting the same trigger event twice in the same direction.

The trigger event may include detecting the object move across more than 50% of the sensor from outside the predefined region into the predefined region and lift off the sensor.

In one embodiment, a method for adjusting a cursor speed may include detecting movement of an object moving proximate a touch sensor at an object speed, applying a cursor speed to a cursor depicted in a display based at least in part on a cursor-to-object speed relationship, detecting a trigger event in the detected object movement, and changing the cursor-to-object speed relationship in response to detecting the trigger event in a predefined region.

BRIEF DESCRIPTION OF THE DRAWINGS

FIG. 11 depicts an example of repetition threshold in accordance with the disclosure.

FIG. 12 depicts an example of an overshoot distance characteristic in accordance with the disclosure.

FIG. 13 depicts an example of a method for adjusting a cursor speed in accordance with the disclosure.

FIG. 14 depicts an example of a method for adjusting a cursor speed in accordance with the disclosure.

FIG. 15 depicts an example of a method for adjusting a cursor speed in accordance with the disclosure.

Figure 1:
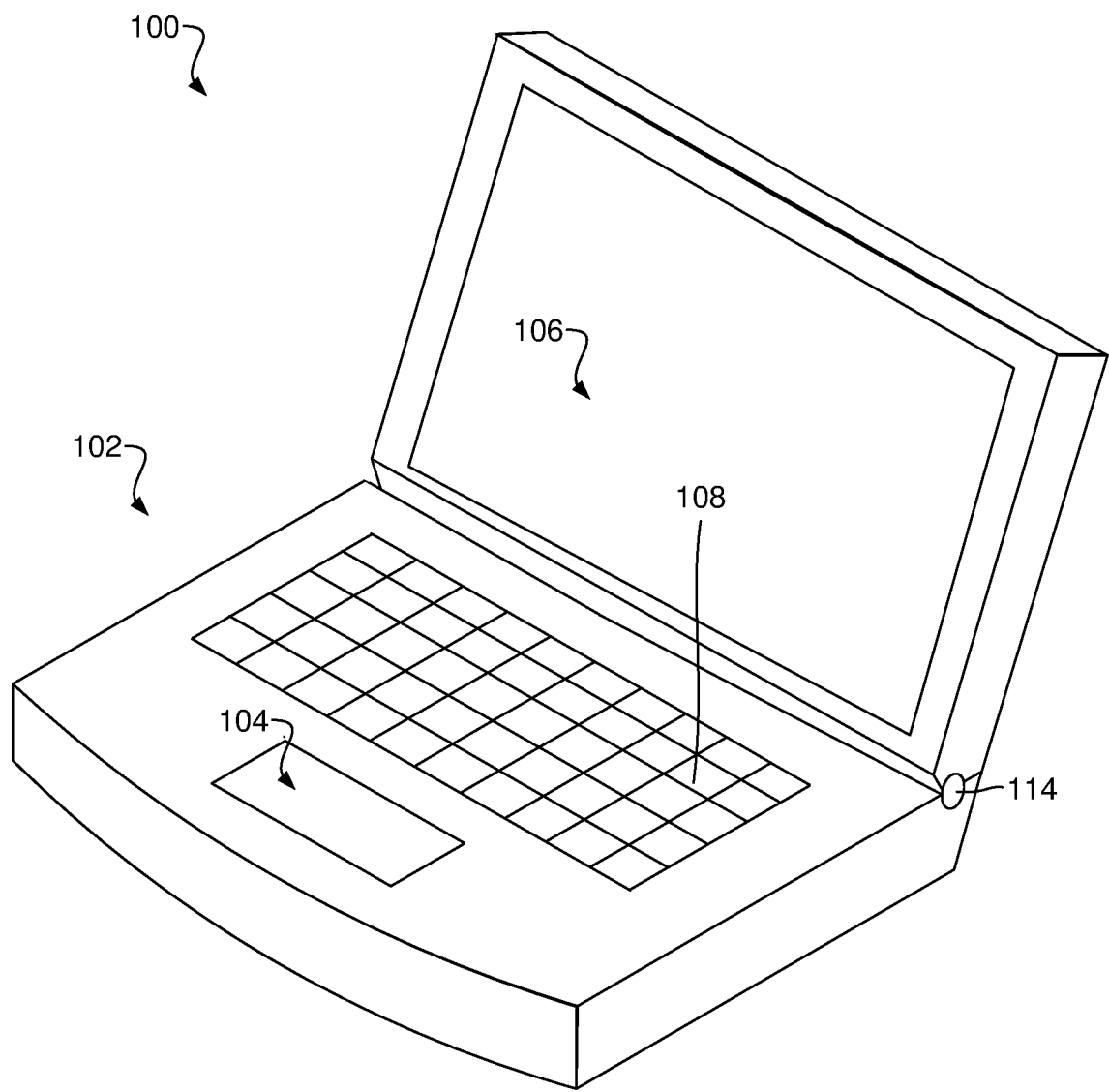
FIG. 1 depicts an example of a portable electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "portable electronic device" may generally refer to devices that can be transported and include a battery and electronic components. Examples may include a laptop, a desktop, a mobile phone, an electronic tablet, a personal digital device, a watch, a gaming controller, a wearable device, another type of device, or combinations thereof.

It should be understood that use of the terms "touch pad" and "touch sensor" throughout this document may be used interchangeably with "capacitive touch sensor," "capacitive sensor," "capacitive touch and proximity sensor," "proximity sensor," "touch and proximity sensor," "touch panel," "trackpad", "touch pad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

For the purposes of this disclosure, the term "object speed" generally refers to the speed at which an object moves proximate to the sensor. The object may be any appropriate object that can be detected by the sensor. In some cases, the object is electrically conductive, and the sensor senses the presence of the object because the electrically conductive object causes a change in capacitance that can be detected by the sense electrode. In some cases, the object is a stylus, a user's finger, another body part of the user, another object, or combinations thereof. The sense electrode may be an electrode using a self-capacitance measuring technique, a mutual capacitance measuring technique, another type of capacitance measuring technique, or combinations thereof.

In some cases, the sensor is located within a housing. The sensor may be underneath the housing and capable of detecting objects outside of the housing. For example, the sensor may be disclosed within a cavity formed by a keyboard housing of a computer, such as a laptop or other type of computing device, and the sensor may be disposed underneath the keyboard housing. In some examples, an opening may be formed in the housing, and an overlay may be positioned within the opening. The sensor may be positioned under the overlay, and the sensor may sense the presence of the object through the overlay.

For the purposes of this disclosure, "moving proximate" the sensor may include the object touching and moving across overlay, housing, or other touch surface. The gaps between such touch surfaces and the sensor and/or the thickness of such overlays or other touch surfaces may cause the sensor to be spaced apart from the touch surface that the object can touch. In such examples, the overlay and/or other touch surfaces cause the object to be separated at least some distance from the sensor. In such an example, even when the object is touching the touch surface and/or the overlay, the object is just proximate to the sensor since the object is still spaced at a distance away from the object even though the object is touching the touch surface. In other examples, being proximate to the touch surface may include examples where the object hovers over the touch surface and/or overlay such that the object does not come into physical contact with the touch surface and/or overlay. In such an example where the object hovers over the touch surface and/or overlay, the object may still be proximate to the touch sensor.

For purposes of this disclosure, the term "object speed" may generally refer to the speed at which the object is moving proximate to the sensor. In some examples, the object speed is determined by the speed at which a user slides the object across the surface of the overlay and/or touch surface. In other cases, the object speed may include a speed at which the object is moved while hovering over the overlay and/or touch surface. In some examples, the object moves in a vector that is aligned with a plane in which the sensor is oriented.

For the purposes of this disclosure, the term "cursor speed" may generally refer to the speed at which a cursor depicted in a display moves in response to the detected movement of the object. In some cases, the cursor speed may be faster than the object speed or vice versa. In some examples, the cursor speed may be mapped at different speed ratios depending on how fast the object is moving. In some cases, the cursor speed is defined by a cursor-to-object speed relationship. This relationship may be defined by an algorithm, stored in a lookup table, stored in another type of table, calculated based on different parameters, or combinations thereof.

In some examples, the cursor-to-object speed relationship may be generally represented on a graph where the one of the axes represents a cursor speed and the other axis represents a cursor speed. In such cases, the relationship may resemble a ballistic curve where the curve may generally depict a generally flat line at the comparatively slower objects speeds and the curve may generally depict a generally vertical line at the comparatively higher object speeds.

For the purposes of this disclosure, the term "overshoot event" may generally refer to an event that indicates that the cursor speed is too fast thereby causing the cursor to move past the destination that the user intended to move the cursor to. For example, the overshoot event may be a back tracking event, where the cursor moves across a long distance in a first direction, stops, moves backwards in a second direction counter to the first direction, then reaches the destination. The destination may be a location in the display where the user selects an icon, hovers over an icon, provides some other type of input, or combinations thereof. The distance from where the cursor stopped to where the cursor is moved backwards to the destination intended by the user may be considered an overshoot distance. In some cases, the length of the overshoot distance may be used to determine how much the cursor overshot the user's intended destination. The length of the overshoot distance may be used as a factor in determining how much to adjust the cursor speed. The overshoot distance may be a factor that is solely or part of a group of factors that determine an overshoot distance characteristic. In some cases, an average of more than one overshoot distance may be used to determine how much to adjust the overshoot distance. Any appropriate characteristic of the overshoot distance(s) may be used to determine how much to adjust the cursor speed. For example, the length of the overshoot distance, the average of multiple overshoot distances, a mean of overshoot distances, a difference of overshoot distances, a direction of overshoot distances, and another factor of the overshoot distance, a speed of overshoot distances, or combinations thereof may be used to determine the how to adjust the cursor speed.

For the purposes of this disclosure, the term "undershooting event" may generally refer to an event that indicates that the cursor speed is too slow thereby causing the cursor to stop short of the destination that the user intended to move the cursor to. For example, the undershoot event may be a scrubbing event, where the cursor moves a first distance in a first direction, stops, moves a second distance in the first direction, stops, and so on until the cursor eventually reaches the destination where the user intends to perform an action. During each stop, the user may be moving the object back to where the user started moving the object so he or she can move the object along the same path again. The number of stops, the length of one of the distances, the average of the distances, the mean of the distances, or another characteristic of the stops and/or distances may be used to determine how much the cursor speed is to be adjusted.

While the examples above have indicated that factors about the trigger event can be used to determine how much to adjust the cursor speed, in some examples, the cursor speed is adjusted a predetermined amount regardless of the specific parameters of an undershoot or overshoot event. In some cases, the decision to adjust the cursor speed may be binary such that if an overshoot event is detected, then the cursor speed is incremented down a predetermined amount, and if there is no detected overshoot event, there is no adjustment made. Likewise, if an undershoot event is detected, then the cursor speed is incremented up a predetermined amount, and if there is no detected undershoot event, there is no adjustment made. In some examples, a standard adjustment may be generally applied to adjust the cursor speed depending on the type of trigger event, while some trigger events or characteristics of trigger events may cause a calculation to be made to determine how much to adjust to the cursor speed.

For the purposes of this disclosure, the term "repetition threshold" may generally refer to a predetermined number of times that a particular trigger event occurs because an adjustment to the cursor speed is made. In one example, each time that a user stops during a scrubbing action may be considered a single scrub event. If the user scrubs once, it may be hard to filter out false positives, so the scrubbing event may need to be determined a couple more times for the system to have a high enough confidence that a scrubbing event is occurring. In one embodiment, the repetition threshold may be three or four scrubs before the system responds by adjusting the cursor speed. An overshoot repetition threshold may also be applied before the system has a sufficient confidence to conclude that the user is overshooting the intended destination. In some cases, the repetition threshold for the overshooting events and the undershooting events is the same, while in other examples, the repetition thresholds may be different depending on the type of trigger event. For example, a first type of overshoot event may have a different repetition threshold than another type of overshoot event. Likewise, a first type of undershoot event may have a different repetition threshold than another type of undershoot event.

For the purposes of this disclosure, the term "lift off" may generally refer to an object moving away, either completely or partially, from the sensor. In some examples, lift off may occur when a user lifts his or her finger and/or stylus off of a touch input surface. In some examples, lift off is determined by detecting a decrease in finger surface area in contact with the touch surface. In other examples, a change in the object's proximity may be detected to determine when lift off occurs. In other cases, lift off may include a measured drop in capacitance with the sensor.

For the purposes of this disclosure, the term "predefined region" may generally refer to region on the touch pad that is used to detect a trigger event to change the cursor-toobject speed relationship. The predefined region may be a trigger region. In some cases, the user input may have to end with the object in the predefined region at least once to trigger the trigger event of changing the cursor-to-object speed relationship. In other examples, the user input may have to end with the object in the predefined region multiple times to trigger the trigger event of changing the cursor-to-object speed relationship.

FIG. 1 depicts an example of a portable electronic device 100. In this example, the portable electronic device is a laptop. In the illustrated example, the portable electronic device 100 includes input components, such as a keyboard 102 and a touch pad 104. The portable electronic device 100 also includes a display 106. A program operated by the portable electronic device 100 may be depicted in the display 106 and controlled by a sequence of instructions that are provided by the user through the keyboard 102 and/or through the touch pad 104. An internal battery (not shown) may be used to power the operations of the portable electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 may include a capacitance sensor disposed underneath a surface containing the keyboard 102. In some examples, the touch pad 104 is located in an area of the keyboard's surface where the user's palms may rest while typing. The capacitance sensor may include a printed circuit board that includes a first layer of electrodes oriented in a first direction and a second layer of electrodes oriented in a second direction that is transverse the first direction. These layers may be spaced apart and/or electrically isolated from each other so that the electrodes on the different layers do not electrically short to each other. Capacitance may be measured at the overlapping intersections between the electrodes on the different layers. However, as the user's finger or other electrically conductive objects approach the intersections, the capacitance may change. These capacitance changes and their associated locations may be quantified to determine where the user is touching or hovering his or her finger within the area of the touch pad 104. In some examples, the first set of electrodes and the second set of electrodes are equidistantly spaced with respect to each other. Thus, in these examples, the sensitivity of the touch pad 104 is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may include a capacitance sensor that is located behind an outside surface of the display 106. As a user's finger or other electrically conductive object approaches the touch sensitive screen, the capacitance sensor may detect a change in capacitance as an input from the user.

While the example of FIG. 1 depicts an example of the portable electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, another type of portable electronic device, another type of device, or combinations thereof.

Figure 2:
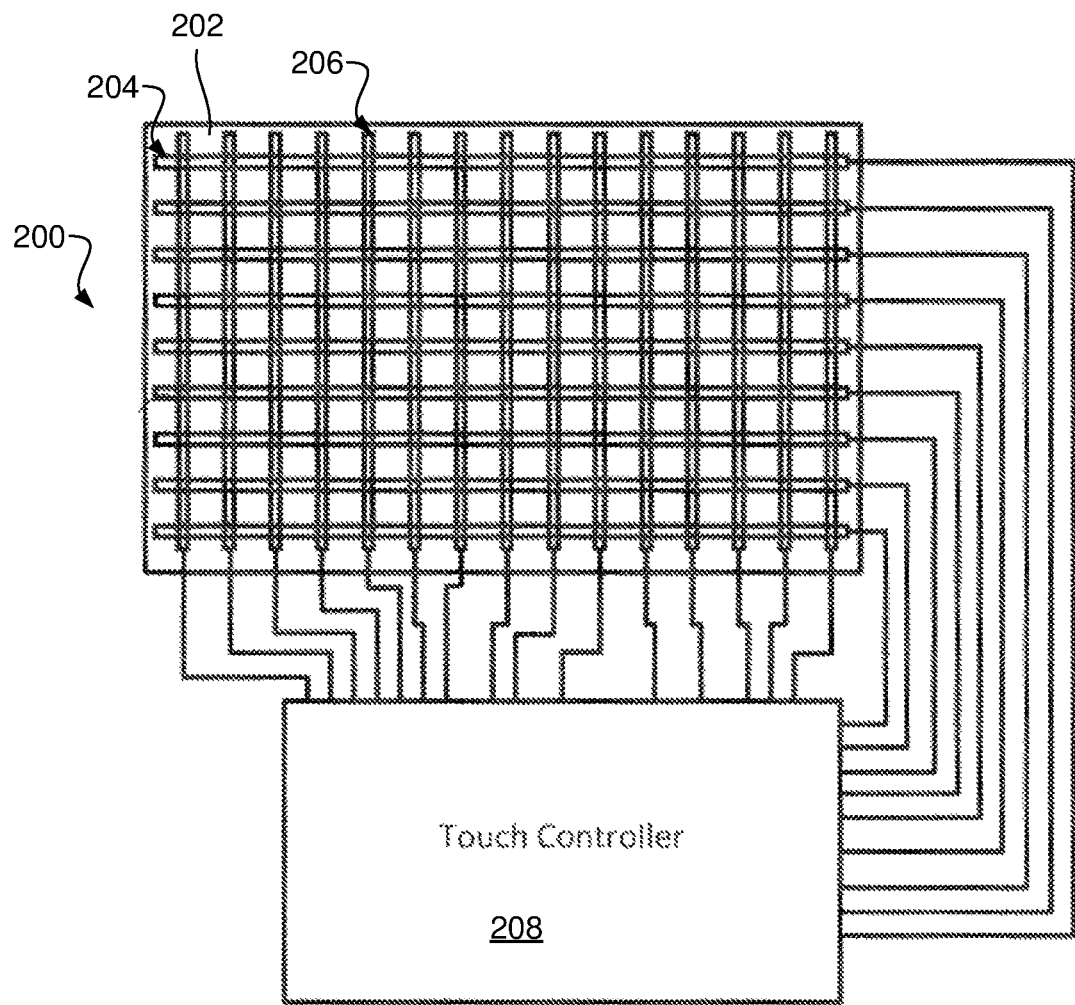
FIG. 2 depicts an example of a substrate with a first set of electrodes and a second set of electrodes in accordance with the disclosure.

FIG. 2 depicts an example of a portion of a touch input component 200. In this example, the touch input component 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The touch input component 200 may include one or more electrodes in the first set 204 or the second set 206. Such a substrate 202 and electrode sets may be incorporated into a touch screen, a touch pad, and/or swell detection circuitry incorporated into a battery assembly.

In some examples, the touch input component 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the touch input controller 208 includes a touch controller 208. The touch controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the touch controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A ground plane shield (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the touch input component 200. The touch input component 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the touch input component 200, the touch controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the touch input component 200 having the flexibility of the switching the sets 204, 206 of electrodes between sense and transmit electrodes, in other examples, each set of electrodes is dedicated to either a transmit function or a sense function.

Figure 3:
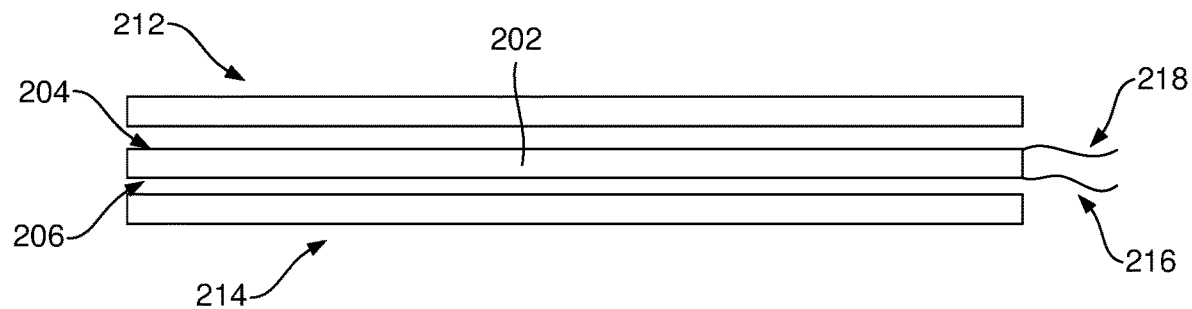
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a touch pad. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a touch pad, the substrate 202 may be located between a touch surface 212 and a shield 214. The touch surface 212 may be a covering that is placed over the first side of the substrate 202 and that is at least partially transparent to electric fields.

As a user's finger or stylus approach the touch surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the portable electronic device. This shield may prevent influence on the electric fields on the substrate 202.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

Figure 4:
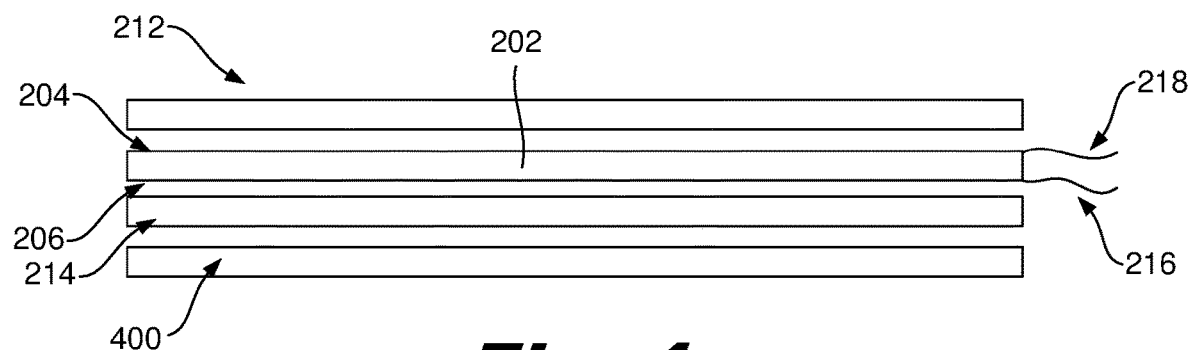
FIG. 4 depicts an example of a touch screen in accordance with the disclosure.

FIG. 4 depicts an example of a touch screen as the touch input controller. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display 400. The display 400 may be a layer of pixels or diodes that illuminate to generate an image. The display may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the touch surface 212 may all be at least partially transparent to allow the display to be visible to the user through the touch surface 212. Such a touch screen may be included in a monitor, a display assembly, a laptop, a mobile phone, a mobile device, an electronic tablet, another type of portable electronic device, or combinations thereof.

Figure 5:
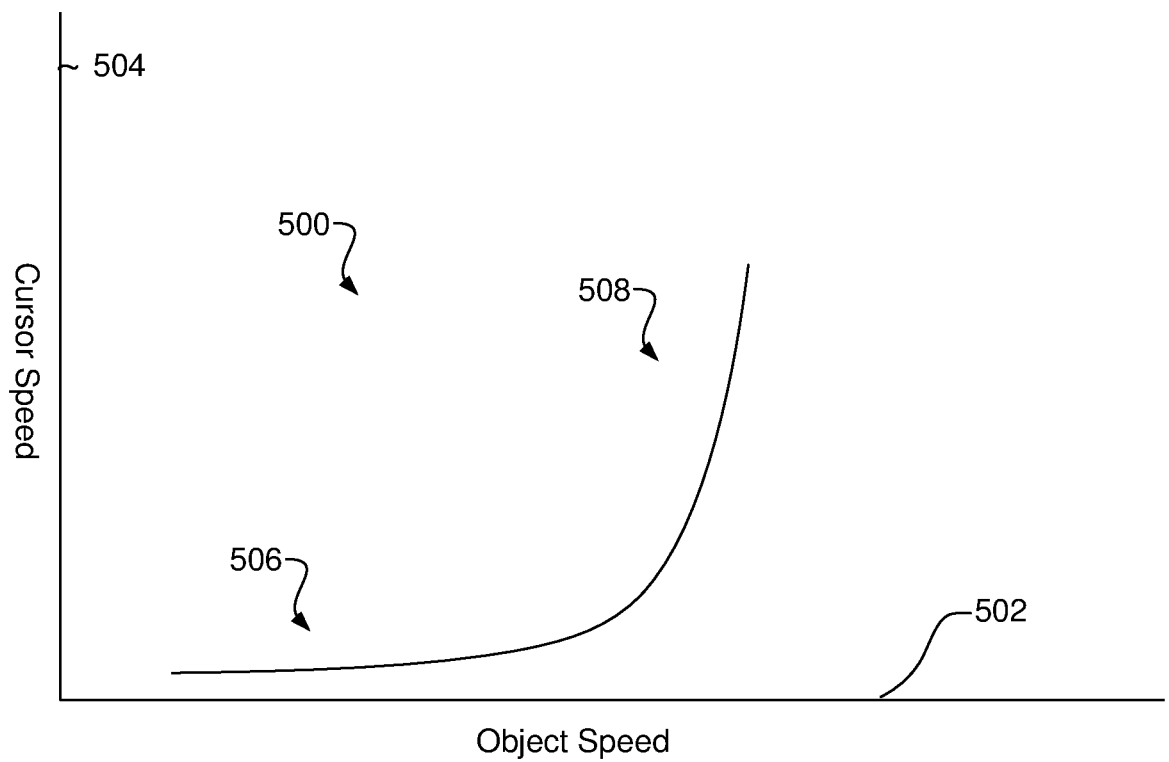
FIG. 5 depicts an example of a cursor-to-object speed relationship in accordance with the disclosure.

FIG. 5 depicts an example of a cursor-to-object speed relationship 500. In this example, the x-axis 502 represents an object speed, and the y-axis represents a cursor speed 504. In a lower object speed range 506, the cursor speed is relatively low and flat. Within the lower object speed range, the cursor speed may move relatively slowly allowing the user to position the cursor in the display with more precision and/or accuracy. In the depicted example, the cursor speed is not a one-to-one ratio with the object speed.

Within a higher object speed range 508, the cursor speed may move relatively quickly allowing the user to move the cursor in the display along a greater distance. In the depicted example, the cursor speed is not a one-to-one ratio with the object speed. In some examples, as depicted in FIG. 5, the cursor speed is adjusted based on the object speed, in a non-one-to-one relationship with the lower object speeds matching to a relatively flat cursor speed that trades in high cursor speed for precision, while the upper cursor speeds trading off precision for distance.

Figure 6:
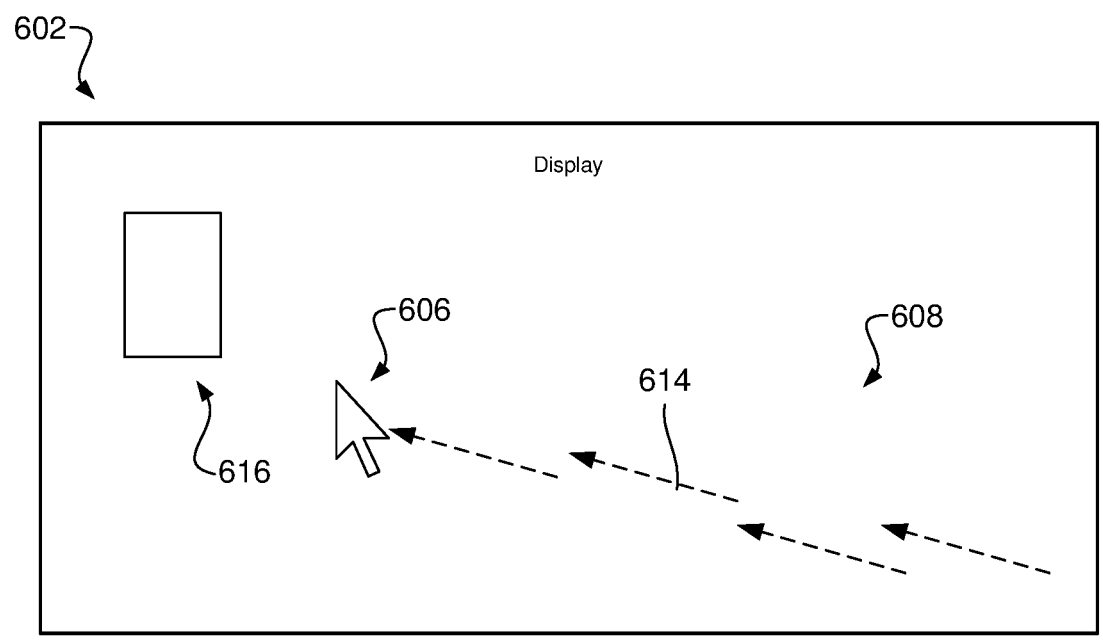
FIG. 6 depicts an example of an undershooting event in accordance with the disclosure.
Figure 6:
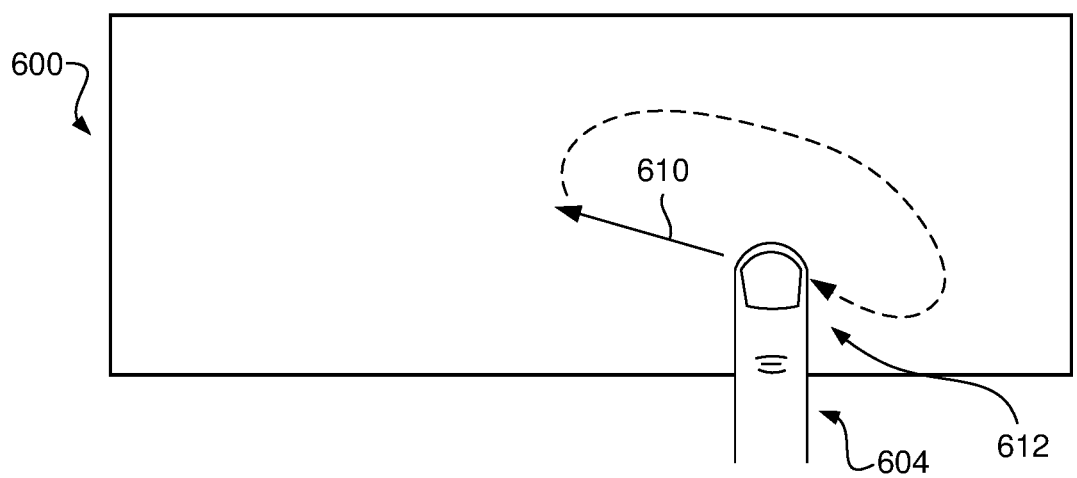

FIG. 6 depicts an example of touch pad 600 and a display 602. In this example, the object 604 is a finger. As the finger moves along the surface of the touch pad 600, the cursor 606 in the display 602 also moves in accordance with the direction of the finger. A scrubbing event 608 is depicted in this example. The scrubbing event 608 may be characterized by several short strokes (represented by line 610) by the finger where the finger returns to generally the same starting area 612 after each stroke is completed. Each stroke may cause the cursor to move a short scrubbing distance (represented by line 614) towards the user's desired destination 616. Accumulatively, each stroke contributes to moving the cursor towards the destination, but none of the individual stokes are sufficient to move the cursor all the way to the desired destination 616. Such scrubbing events may indicate that the user is moving the cursor slowly within the lower object speed range when the cursor is to move over a long distance. This may indicate that the user may benefit from increasing the cursor speed within the lower object speed range.

Figure 7:
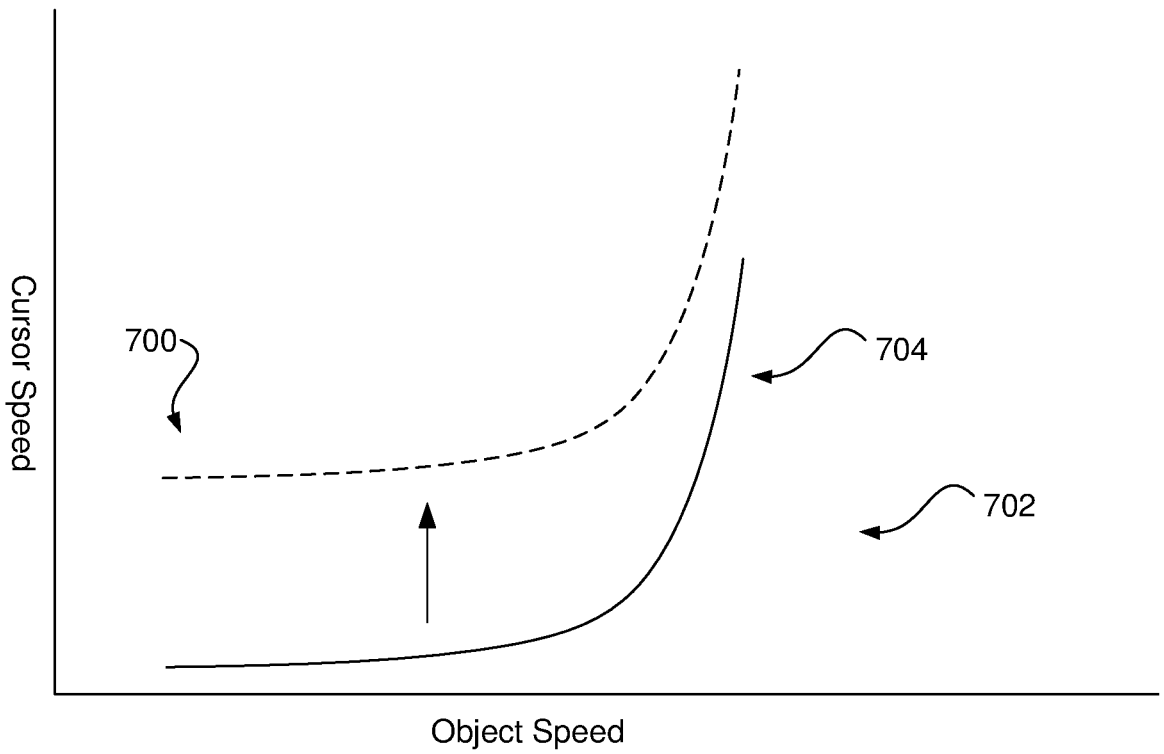
FIG. 7 depicts an example of adjusting a cursor speed in accordance with the disclosure.
Figure 8:
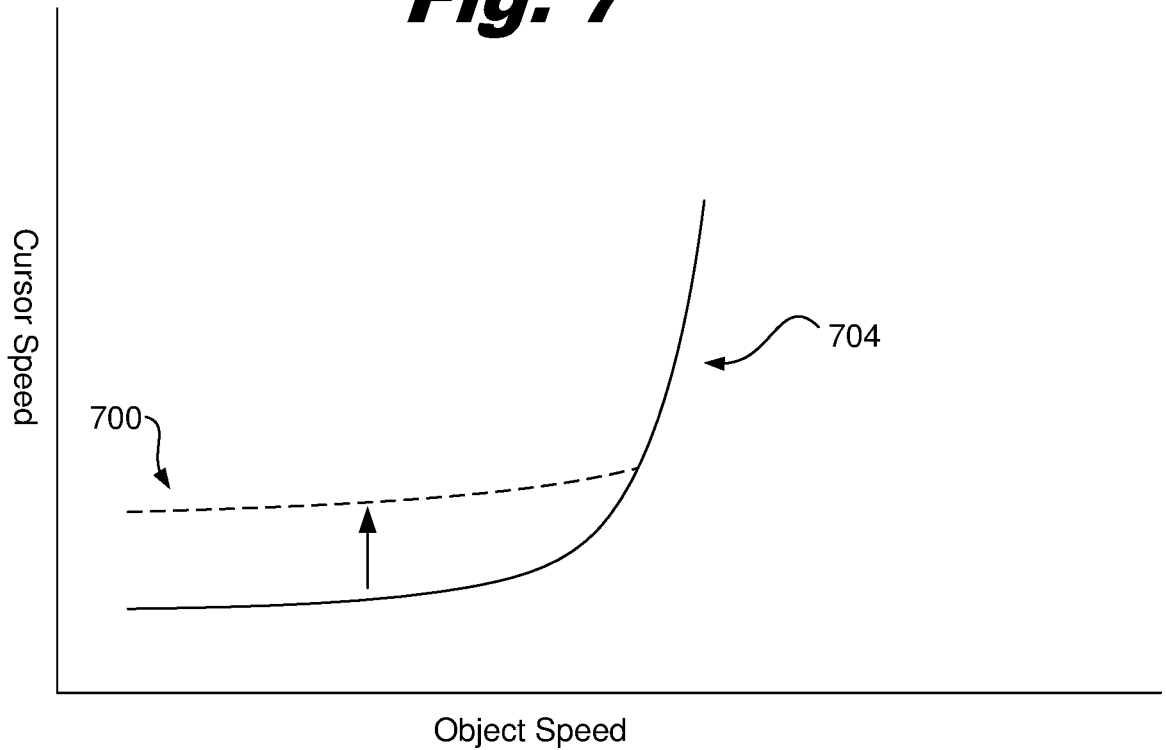
FIG. 8 depicts an example of adjusting a cursor speed in accordance with the disclosure.

FIG. 7 depicts an example where the cursor speed is increased within the lower object speed range 700. In this example, the entire cursor-to-object speed relationship 702 is moved upwards indicating that the cursor speeds in both the lower object speed range 700 and in the upper object speed range 704 are increased. FIG. 8 depicts an example where just the cursor speed in the lower object speed range 700 is increased while the cursor speed in the upper object speed range 704 is maintained at the same cursor speed.

Figure 9:
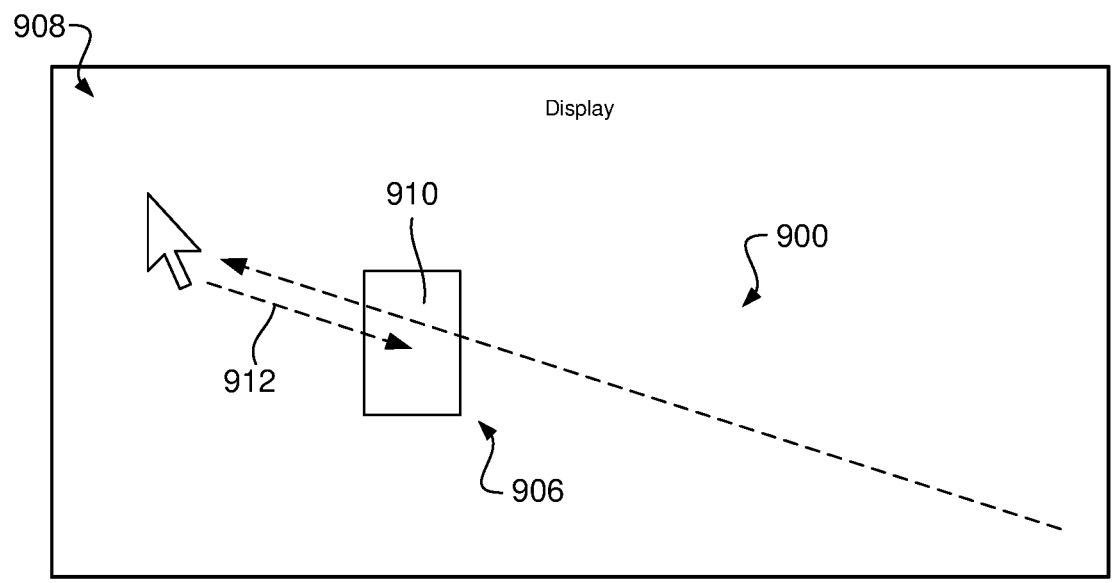
FIG. 9 depicts an example of an overshooting event in accordance with the disclosure.
Figure 9:
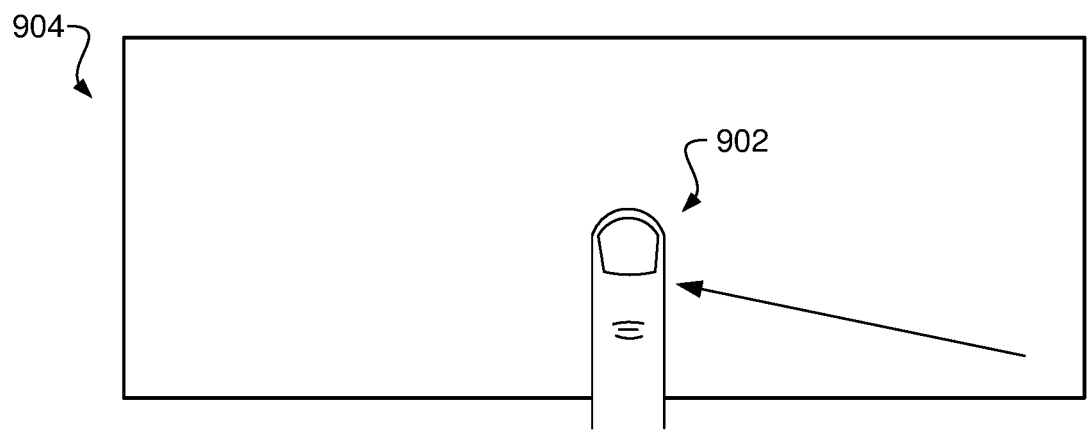

FIG. 9 depicts an example of a back tracking event 900. In this example, the object 902 is a finger that is moving along the surface of a touch pad 904. In this example, the finger moves fast enough across the surface of the touch pad 904 that the cursor 906 moves across the display 908 at a distance greater than intended by the user in a first direction. In such an example, the cursor 906 moves past the intended destination 910 such that the user then needs to move the cursor back in a second direction that is generally opposing the first direction until the cursor 906 reaches the intended destination 910. The distance from where the cursor originally stopped and the destination may be considered an overshoot distance 912.

Figure 10:
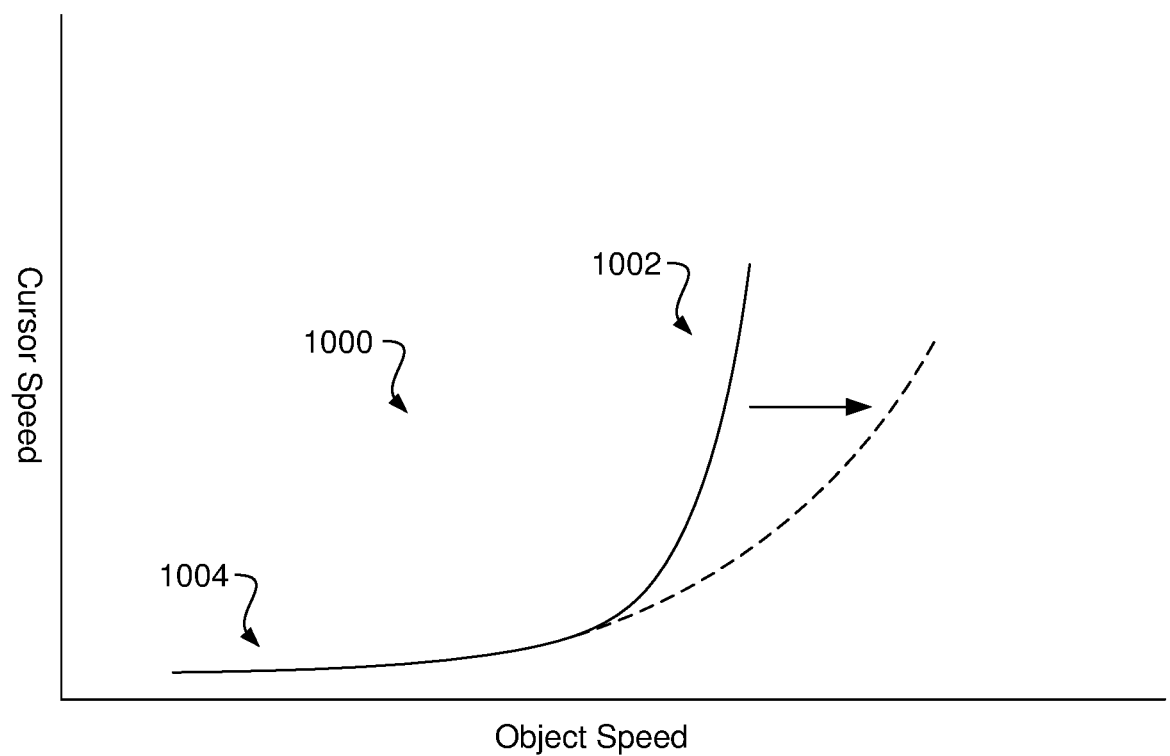
FIG. 10 depicts an example of adjusting a cursor speed in accordance with the disclosure.

FIG. 10 depicts an example of changing the cursor-to-object speed relationship 1000 in the upper object speed range 1002 so that the cursor speed in the upper object speed range 1002 is lowered. In this way, the user may move the cursor the distance that may seem natural to him or her to move the cursor to get to the intended destination. In the example of FIG. 10, the cursor speed in the lower object speed range 1004 is maintained; however, in other examples, the cursor speed in the lower object speed range 1004 may also be lowered.

In some examples, a single scrubbing event, a single back tracking event, a single event indicating an overshoot, a single event of an undershoot, or another type of single event may cause the change to the cursor-to-object speed relationship. However, in some cases, multiple events of the same type of event may be detected before the adjustment is made. In some cases, detecting several events may prevent against false positive readings. In other examples, the characteristics of multiple events may be used to determine how much of an adjustment should be made.

For example, several single scrub events may be detected before the cursor speed is adjusted. In some cases, detecting several scrub distances may be used to determine how much to adjust the cursor speed. For example, if the system detects just two scrub events, the system may determine to double the cursor speed in the lower object speed range so that the distance traveled in this lower range is twice as far. However, in an example, where four scrub events are detected before the cursor reaches the user's desired destination, the system may determine to increase the cursor speed in the lower object speed range by a factor of four so that the cursor distance within the same object speed range will move four times as far. In some cases, detecting multiple scrubbing events to accumulatively move the cursor to a single destination may be all that is needed to trigger a change in the cursor speed. However, in some cases, scrubbing events moving the cursor at different times to different destinations may be involved before a change in the cursor speed is made.

In another example, multiple back tracking events may be involved before a change is made to the cursor speed in the upper object speed range. In some cases, different back tracking events at different times where the user is moving the cursor to different destinations may be involved before the cursor speed is changed.

The number times that a trigger event may be needed to cause the change in the cursor speed may depend on the specific characteristics of each type of event. For example, it may be easier to detect some types of trigger events than others with enough confidence to minimize false positives. In the example of FIG. 11, the repetition threshold 1100 for scrubbing events is depicted as four, and the repetition threshold 1102 for back tracking events is depicted as two. However, these thresholds are merely examples and any appropriate repetition threshold for these types of trigger events may be selected.

Specific characteristics of each of the trigger events may be used to determine how much to change the cursor speed. In the example of FIG. 12, different detected back tracking speeds 1200 are recorded. An average of each of the overshoot distances may be calculated, and the average overshoot distance may be used in a process to determine how much to adjust the cursor speed. While the average overshoot distance and the average scrubbing distance has been described as an example of characteristics to be used to determine the how much to adjust the cursor speed, any appropriate characteristic can be used to determine how much to adjust the cursor speed. For example, the speed of the cursor may be calculated, and the calculated speed may be used to determine how much to change the cursor speed. While a cursor speed and a cursor distance have been used as characteristics to determine how much to adjust the cursor speed, any other appropriate characteristics may be used.

In other examples, cursor speed is adjusted a predetermine amount without using detected characteristics. In such examples, the predetermined amount is a consistent amount that increments the cursor speed up or down depending on the trigger event. For example, if the trigger event determines that the cursor speed in the upper object speed range or the lower object speed range is to be increased or decreased, the system may cause the speed to be incremented up or down in consistent amounts. If the increase or decrease is not enough, the system may detect the trigger events again, and the system may increase or decrease the speed the same consistent amount. If the adjustment, yet again, is not enough, the system may detect the trigger event yet again, and the system may make the same incremental adjustment until the trigger events are no longer detected. Such a system may save processing resources since the system does not have to dedicate resources to determine how much to change to the cursor speed. A further advantage is that the cursor speed may adjust more slowly, which may be easier for the user.

Figure 13:
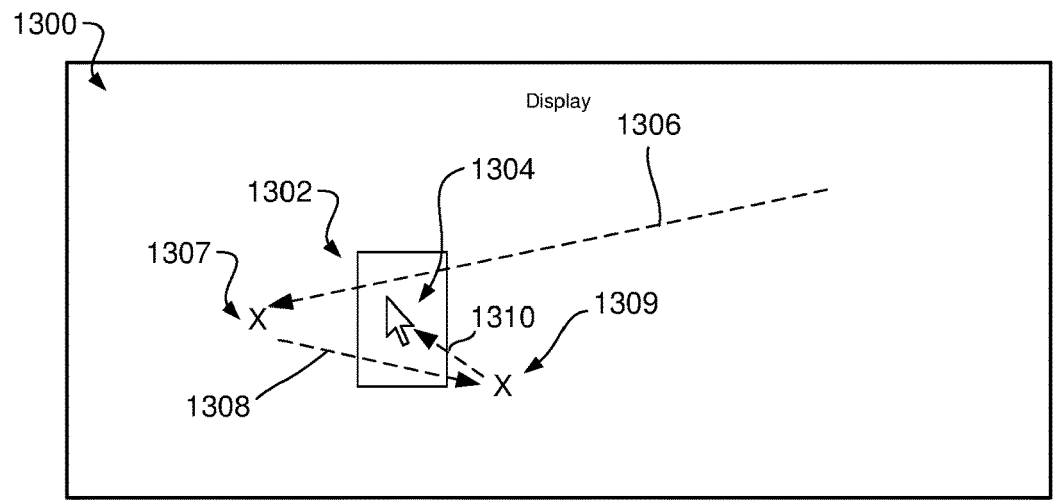
FIG. 13 depicts an example of a moving a cursor in accordance with the disclosure.

FIG. 13 depicts an example of a display 1300 with an intended destination 1302 and a cursor 1304. The cursor 1304 may be moved in response to detected movement of an object proximate a touch pad as described above. In this example, a first initial movement of the object proximate the touch pad may cause the cursor 1304 to move passed the intended destination 1302 a first cursor distance 1306 in a first direction to a first overshoot position 1307. As depicted, this first cursor distance 1306 is longer than necessary to move the cursor 1304 to the intended destination. Thus, the actual cursor distance moved is longer than the cursor distance necessary to reach the intended destination 1302 and thereby, in this example, depicts an overshooting event.

A second movement of the object proximate the touch pad (not shown) may cause the cursor to move a second cursor distance 1308 in a second direction to a second overshoot position 1309. The direction of the second cursor distance is generally opposed to the first direction even though they are less than 180 degrees out of phase with each other. In this example, the second cursor distance 1308 is also longer than necessary to move the cursor 1304 to the desired destination 1302. In such a situation, the second cursor distance 1308 may not represent a true overshoot distance that can be used to determine how much the first cursor movement overshoot the intended destination 1302.

In the depicted example, a third movement of the object proximate the touch pad (not shown) may cause the cursor to move a third cursor distance 1310. In this example, the cursor 1304 may have reached the intended destination 1302. In some cases, the user may provide a click input or perform another type of action within the intended destination 1302, which the system may use to determine that the intended destination 1302 was reached. In some cases, the intended destination is an area that spans in two dimensions. In some cases, the intended destination 1302 may at least partially overlap with the location of an icon or other image depicted in the display 1300. As a result, the distance necessary to reach the intended destination 1302 may fall within a range.

In the example depicted in FIG. 13, the actual cursor movement is within the necessary range to necessary to move the cursor 1304 to the intended destination 1302. In such an example, the third cursor movement 1310 may represent the actual distance necessary for the cursor 1304 to reach the intended destination 1302 and may therefore be used to assist in determine a true overshoot distance. However, as depicted, the overshoot sub-distance (the difference between the actual cursor movement and the cursor movement necessary to reach the intended destination) of the second cursor distance 1308 is less than the overshoot sub-distance of the first cursor distance 1306. To determine the overshoot distance of the first cursor distance 1306, the distance between the intended destination and the first overshoot position 1307 may be determined. In this example, the first overshoot distance, the second overshoot distance, or combinations of the first and second overshoot distance may be used to determine how much to adjust the cursor speed.

In some cases, the system may determine, based on the abrupt change in direction between the first cursor distance 1306 and the second cursor distance 1308, that the cursor overshot the intended destination 1302. At such a moment, the system may not know where the intended destination is since the user has not provided a click input or other action that may indicate that the cursor reached the intended destination. In some examples, however, the system may adjust the cursor speed, even before the intended destination is reached, since an overshoot trigger event was detected by the abrupt change in direction. With the cursor speed adjusted in response to the trigger event, the cursor speed may be comparatively slower during the second cursor distance 1308. Further, the system may also detect the abrupt change between the second cursor direction 1308 and the third cursor direction 1310. Thus, in this example, the cursor movement may be adjusted in real time and may assist the user is guiding the cursor to the adjusted destination. While this example has been described with adjusting the cursor speed before the intended destination is reached, other examples include the cursor speed only after determining the intended destination. In yet another example, the abrupt change in cursor direction may be used to determine an overshoot event, however, the repetition threshold may still require that several overshoot events be determined before the cursor change is applied. In one type of such an example, the cursor speed may be the same during the first and second cursor distances 1306, 1308, but the new cursor speed may be applied to the third cursor distance 1310.

Figure 14:
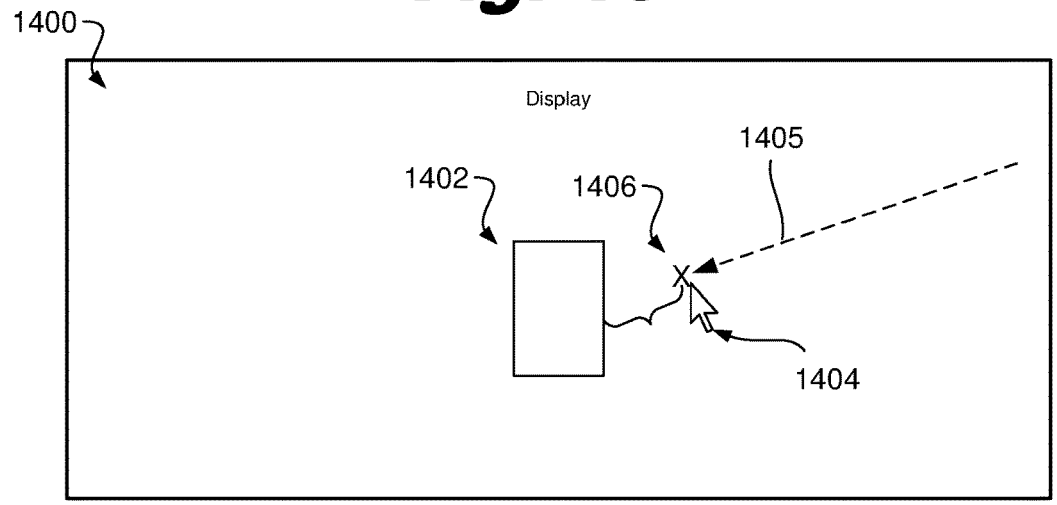
FIG. 14 depicts an example of a moving a cursor in accordance with the disclosure.

FIG. 14 depicts an example of a display 1400 with an intended destination 1402 and a cursor 1404. In this example, the intended destination 1402 may be known to the system before the user causes the cursor to be moved. In such an example, the system may have an application that allows the user to adjust the cursor speed. While some of the examples described above may allow for the cursor speed to be adjusted while the user in the process of using other applications, the application being used in the depiction of FIG. 14 may be an option that allows the user to change the cursor speed. One advantage of such a program is that the system may determine the cursors speed, based off of the user's performance in the application rather than having the user tell the system at which speed to set the cursor speed. In some cases, the user may only guess to which speed to apply the cursor, and the try the selected cursor speed to determine if the cursor speed feels natural to the user. Guessing at the cursor speed may led to user frustration especially where it may be desirable to have non-one-to-one ratios in the cursor-to-object speed relationship. Such an application, as the one described in regard to FIGS. 14 and 15 may allow for the proper setting of the cursor speed in the upper object speed range and in the lower object speed ranges.

As depicted in FIG. 14, the user may be instructed to move the cursor 1404 by moving the object proximate the touch sensor. In this example, the cursor 1404 is moved an undershoot distance 1405 and stops short of the intended destination 1402 at an undershoot position 1406. The system may recognize that the cursor stopped to determine the undershoot position 1406. In some cases, the user may provide a click input or perform some other type of action to indicate the undershoot position 1406. In response to determining the existence of an undershoot position 1406, the system may determine the length of the first distance 1405 to determine how to adjust the cursor speed, determine the distance between the undershoot position 1406 and the intended destination 1402 to determine how to adjust the cursor speed, look up the coordinates of the undershoot position 1406 in a look up table to determine how to adjust the cursor speed, perform another action to determine how to adjust the cursor speed, or combinations thereof.

In some cases, the system may have the user repeat the exercise of moving the cursor 1404 to the intended destination 1402. In some cases, the system may adjust the cursor speed before having the user move the cursor again. However, in other examples, the system may have the user move the cursor multiple times to gather additional data before adjusting the cursor speed. In some cases, the system may cause the cursor's starting position to be in different locations of the display 1400 when having the user move the cursor again. In yet other examples, the intended destination 1402 may be moved to a different position when having the user move the cursor again.

Figure 15:
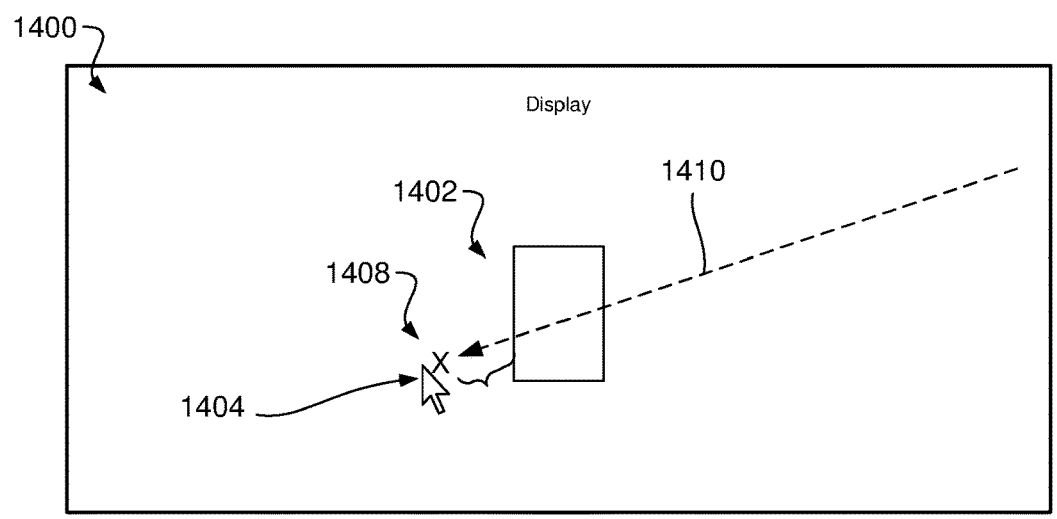
FIG. 15 depicts an example of a moving a cursor in accordance with the disclosure.

FIG. 15 depicts another example of using the application to determine the cursor speed. In this example, the cursor 1404 is moved to an overshoot position 1408. In response to determining the existence of an overshoot position 1408, the system may determine the length of the overshoot distance 1410 to determine how to adjust the cursor speed, determine the distance between the overshoot position 1408 and the intended destination 1402 to determine how to adjust the cursor speed, look up the coordinates of the overshoot position 1408 in a look up table to determine how to adjust the cursor speed, perform another action to determine how to adjust the cursor speed, or combinations thereof.

Figure 16:
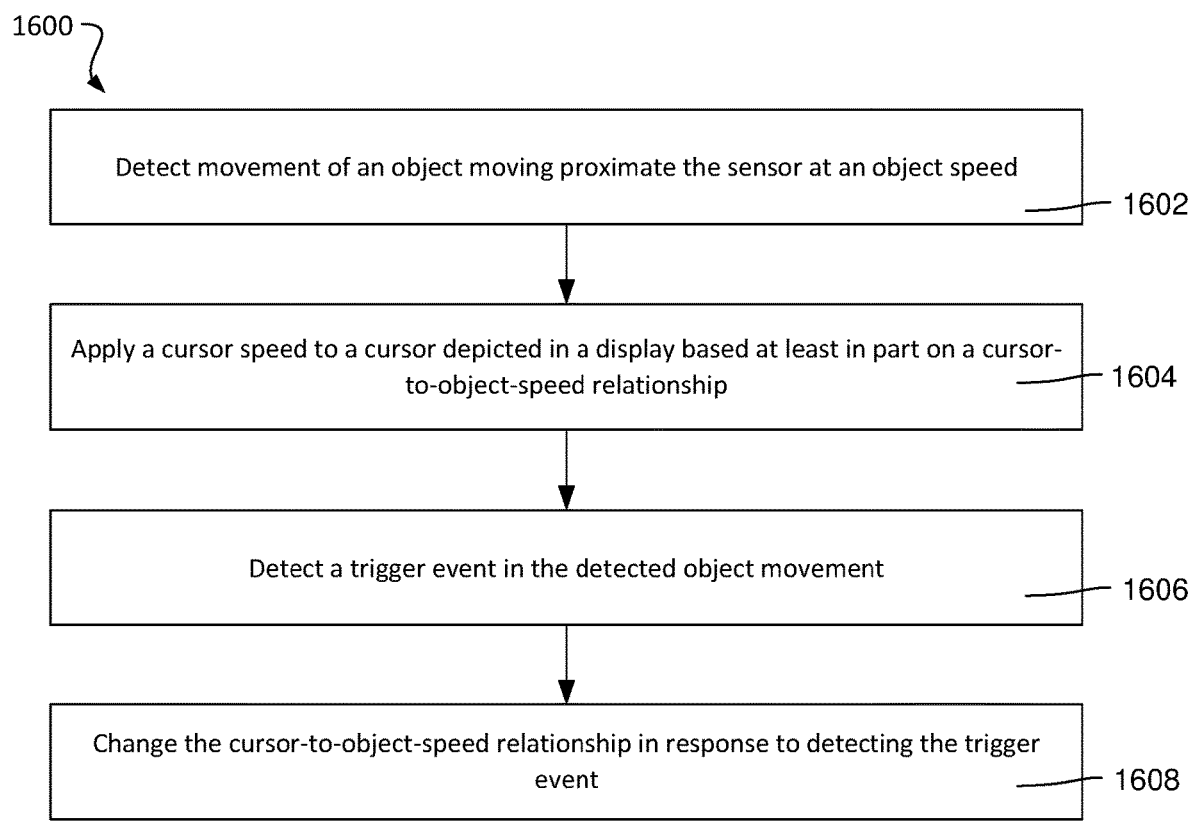
FIG. 16 depicts an example of a method for adjusting a cursor speed in accordance with the disclosure.

FIG. 16 depicts an example of a method 1600 for adjusting cursor speed. This method 1600 may be performed based on the description of the devices, modules, and principles described in relation to FIGS. 1-15. In this example, the method 1600 includes detecting 1602 movement of an object moving proximate the sensor at an object speed, applying 1604 a cursor speed to a cursor depicted in a display based at least in part on a cursor-to-object speed relationship, detecting 1606 a trigger event in the detected object movement, and changing 1608 the cursor-to-object speed relationship in response to detecting the trigger event.

In some examples, the changing the cursor-to-object speed relationship is done automatically without instructions from the user. When the system detects the trigger events, the system may make the adjustments. In some cases, the user may have a setting option where the user can set the cursor speed. In some cases with selectable user options, the user's setting may prevent the system from making additional adjustments to the cursor speed. In other examples, the user may initially set the cursor speed, but the system may override the user's selections. In some cases, the principles disclosed herein may be part of a program that is constructed to test the user's control of the cursor, and the data from this program may be used to provide input to the computer system on where to set the cursor speed.

Figure 17:
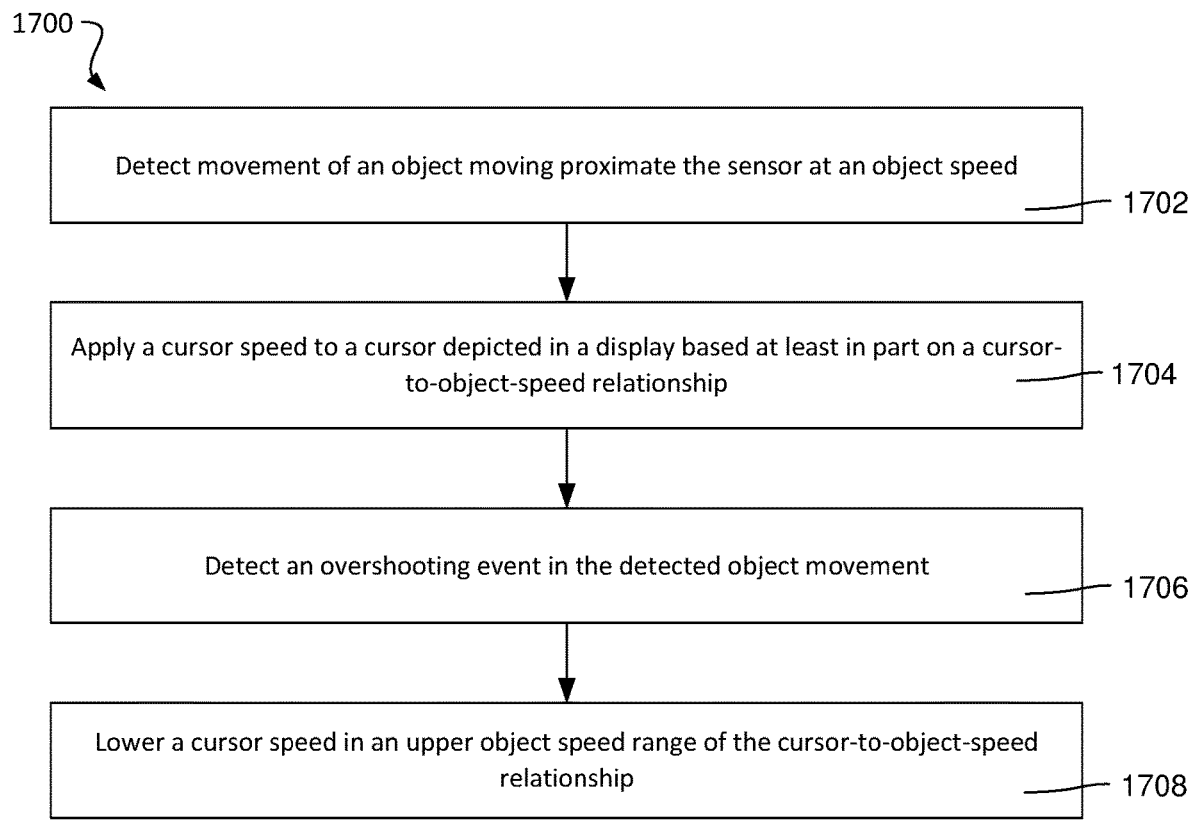
FIG. 17 depicts an example of a method for adjusting a cursor speed in accordance with the disclosure.

FIG. 17 depicts an example of a method 1700 for adjusting cursor speed. This method 1700 may be performed based on the description of the devices, modules, and principles described in relation to FIGS. 1-15. In this example, the method 1700 includes detecting 1702 movement of an object moving proximate the sensor at an object speed, applying 1704 a cursor speed to a cursor depicted in a display based at least in part on a cursor-to-object speed relationship, detecting 1706 an overshooting event in the detected object movement, and lowering 1708 a cursor speed in the upper object speed range of the cursor-to-object speed relationship.

Figure 18:
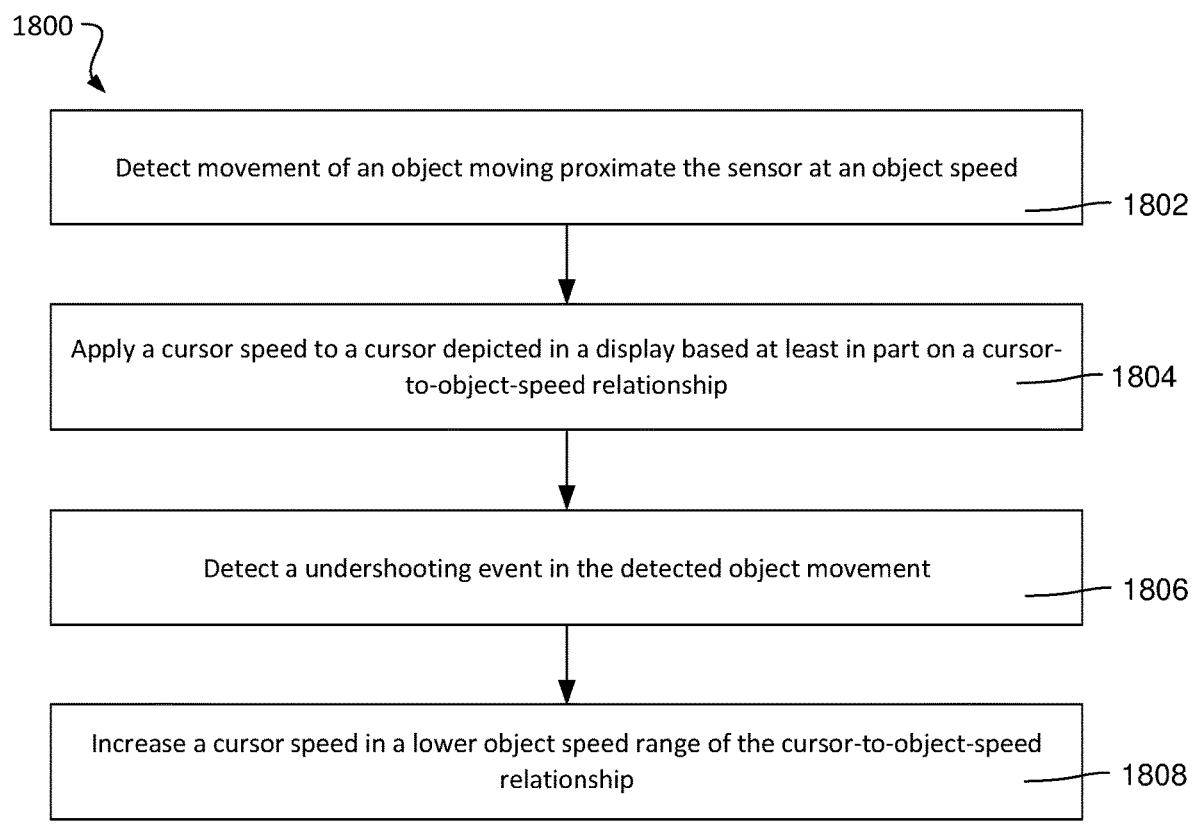
FIG. 18 depicts an example of a method for adjusting a cursor speed in accordance with the disclosure.

FIG. 18 depicts an example of a method 1800 for adjusting cursor speed. This method 1800 may be performed based on the description of the devices, modules, and principles described in relation to FIGS. 1-15. In this example, the method 1800 includes detecting 1802 movement of an object moving proximate the sensor at an object speed, applying 1804 a cursor speed to a cursor depicted in a display based at least in part on a cursor-to-object speed relationship, detecting 1806 an undershooting event in the detected object movement, and increasing 1808 a cursor speed in a lower object speed range of the cursor-to-object speed relationship.

Figure 19:
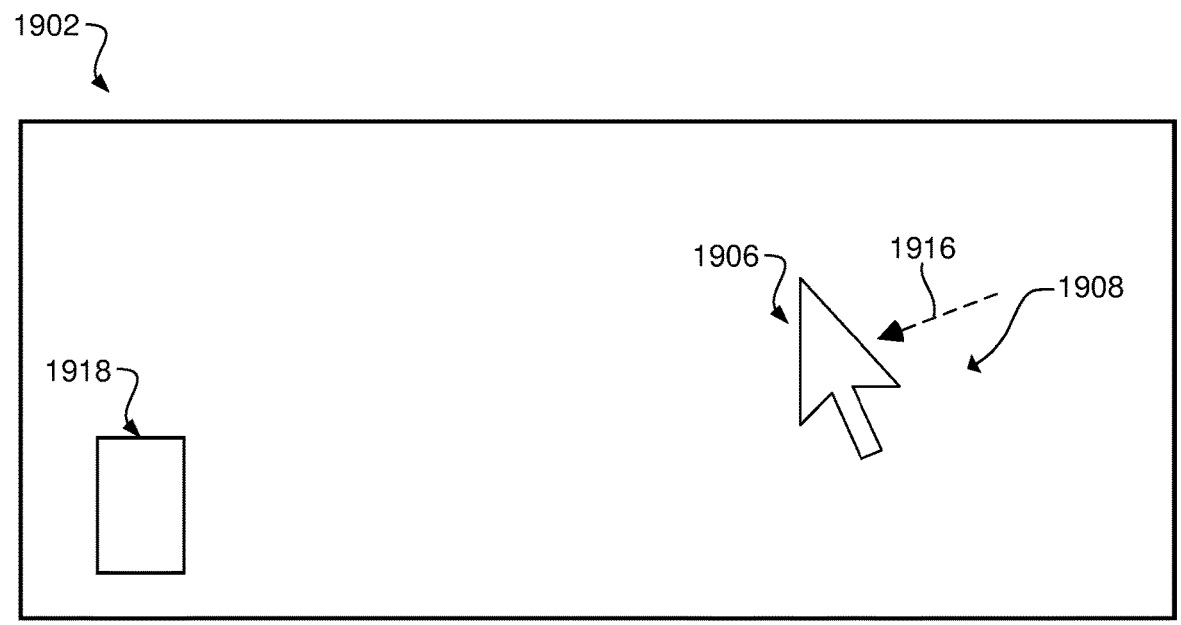
FIG. 19 depicts an example of a trigger event in accordance with the disclosure.
Figure 19:
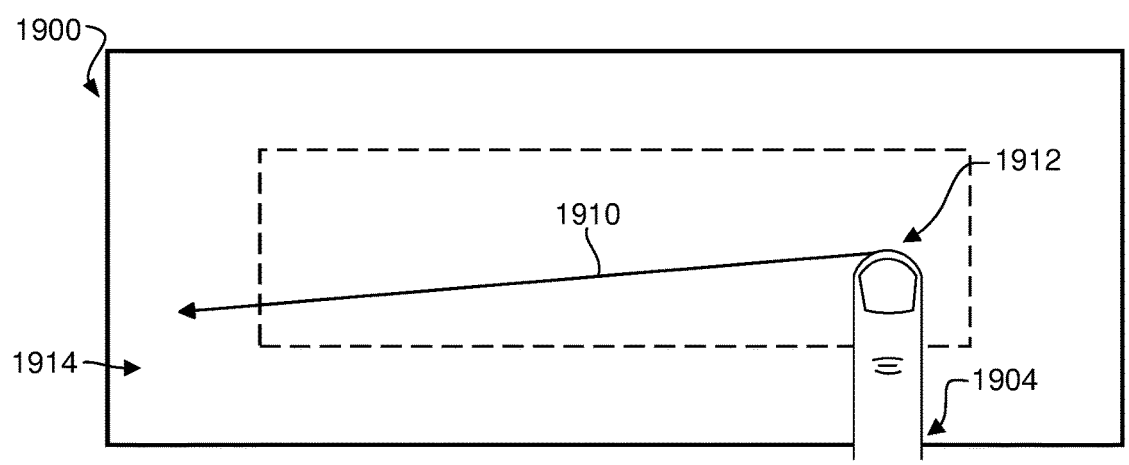

FIG. 19 depicts an example of a touch pad 1900 and a display 1902. In this example, the object 1904 is a finger. As the finger 1904 moves along the surface of the touch pad 1900, a cursor 1906 in the display 1902 also moves in accordance with the direction of the finger 1904. A trigger event 1908 is depicted in this example. The trigger event 1908 may be characterized by movement of the finger 1904 which begins at a location 1912 outside of a predefined region 1914 and moves along the path 1910 into the predefined region 1914.

In some examples, movement from location 1912 into region 1914 may cause the cursor 1906 to move a shorter distance (represented by line 1916) towards the user's desired destination 1918 in the display than the object moved across the touch surface. This event may indicate that the cursor-to-object speed relationship is too slow and may help determine that the user may benefit from increasing the speed of the cursor-to-object speed relationship.

In some examples, after movement from the location 1912 into region 1914, the finger 1904 may lift off of the touchpad 1900, indicating that the user input is complete. Lift off may be determined by the user lifting a finger off the touch pad. This may include a change in the relative capacitance measured by the sensor, a detected decrease in the surface area of the finger in contact with the touch sensor, or a change in the finger's proximity to the touch sensor. In some examples, this lift off may determine the end of a user input. In some cases, lift off in the predefined location may confirm that the trigger event occurred. In some examples, the location of lift off may help determine how to change the cursor-to-object speed relationship.

In some examples, if the trigger event 1908 occurs more than once, it may indicate that the user may benefit from increasing the speed of the cursor-to-object speed relationship. In some examples, the repeated trigger events may be in the same general direction. In other examples, the direction of repeated trigger events may be irrelevant to determining a change in the cursor-to-object speed relationship. In some examples, the number of repetitions necessary to change the cursor-to-object speed relationship may be a predetermined threshold. In other examples, this threshold may be adjusted by user preference.

In some examples, the width of the region may be within 20 percent of the width of the touchpad 1900. In some examples, the width of the region may be within 20 percent of the length of the touchpad. In some examples with multiple predefined regions, some areas of the region may have a different width than other areas of the region.

In some examples, the trigger event may involve an object starting outside the predefined region 1914 and moving into the region. In other examples, the trigger event may involve the object beginning inside the predefined region, leaving the predefined region, and returning into the predefined region. In yet other examples, the trigger event may involve the path of the object residing entirely inside the predefined region.

In some cases, the width of the region 1914 may be used to help determine the change in the cursor-to-object speed relationship. In other cases, the cursor-to-object speed relationship may help determine the width of the region 1914.

In some examples, the region 1914 may be considered an edge of the sensor. This may be considered every edge of the sensor, surrounding the inner part of the sensor on all sides with a margin of five percent of a dimension of the sensor. However, in other examples, the region 1914 may be a specific edge of the sensor. In yet other examples, the region may be any shape or region adjacent to the edge of the sensor. In some cases, the sensor may be smaller than the faceplate of the sensor.

In some cases, the object 1904 is detected as moving approximately transverse to the edge of the sensor. In some cases, the object 1904 may move from outside the region 1914 to inside the region before the object lifts off. In some cases, the object may move more than 50 percent of the width of the object before entering the region. In some cases, the objects speed along its path into the region may be used to help determine the change in the cursor-to-object speed relationship. In some cases, the distance traveled by the object 1904 along its path into the region may be used to help determine the change in the cursor-to-object speed relationship.

In some cases, how the cursor-to-object speed relationship is changed may result in additional factors than just detecting a trigger event. For example, the trigger event may be detecting that the object moves into the predefined region. But, intensity factors that may be used to determine how to change the cursor-to-object speed relationship or by how much to the cursor-to-object may be used. An example of an intensity factor may include an average speed that the object traveled before entering into the predefined area. In some cases, when the speed of the object is moved at a substantially different speed on average than the cursor, the amount of the cursor-to-object speed relationship may change more. In another example, the intensity factor may include the distance traveled. For example, if the object is detected to travel over 50 percent of the length of the touch pad before entering the predefined region, then the among that the cursor-to-object speed relationship may be changed may be different than if the object only moved along ten percent of the length of the touch pad.

In some cases, if the intensity factor is low (e.g., the average object speed is low, the object distance traveled is extremely short, etc.) than the system may determine that a intensity threshold is too low to trigger the trigger event. Thus, in some cases, the trigger event occurs only if the intensity factor is sufficient enough to be over a predetermined threshold and the object enters into the predefined region and/or the user input ends in the predefined region.

Figure 20:
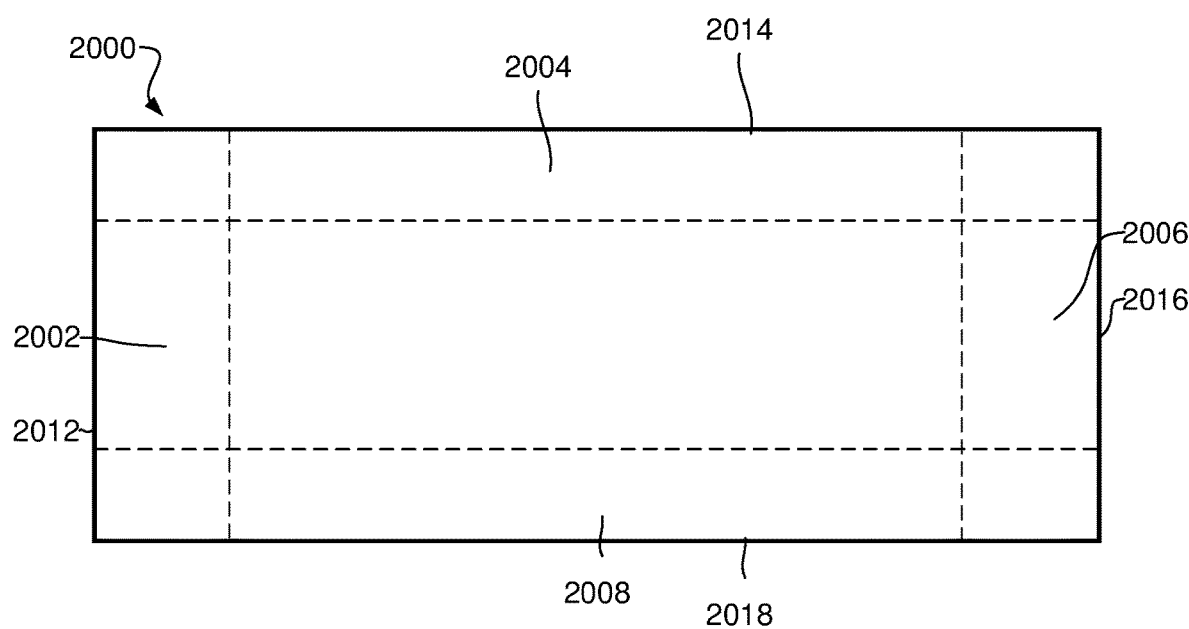
FIG. 20 depicts an example of a touchpad with four predefined regions in accordance with the disclosure.

FIG. 20 depicts an example of a touch pad 2000 with four distinct predefined regions adjacent the four edges of the touch pad: predefined region 2002 adjacent edge 2012, predefined region 2004 adjacent edge 2014, predefined region 2006 adjacent edge 2016, and predefined region 2008 adjacent edge 2018. In some examples, these predefined regions 2002, 2004, 2006, 2008 independently detect a trigger event when lift off occurs within their areas or when the object moves into these regions. In some cases, these regions extend from one edge of the touchpad to the opposite edge of the touchpad. In examples, there is a single predefined region, but in other examples, there are multiple discontinuous predefined regions.

Figure 21:
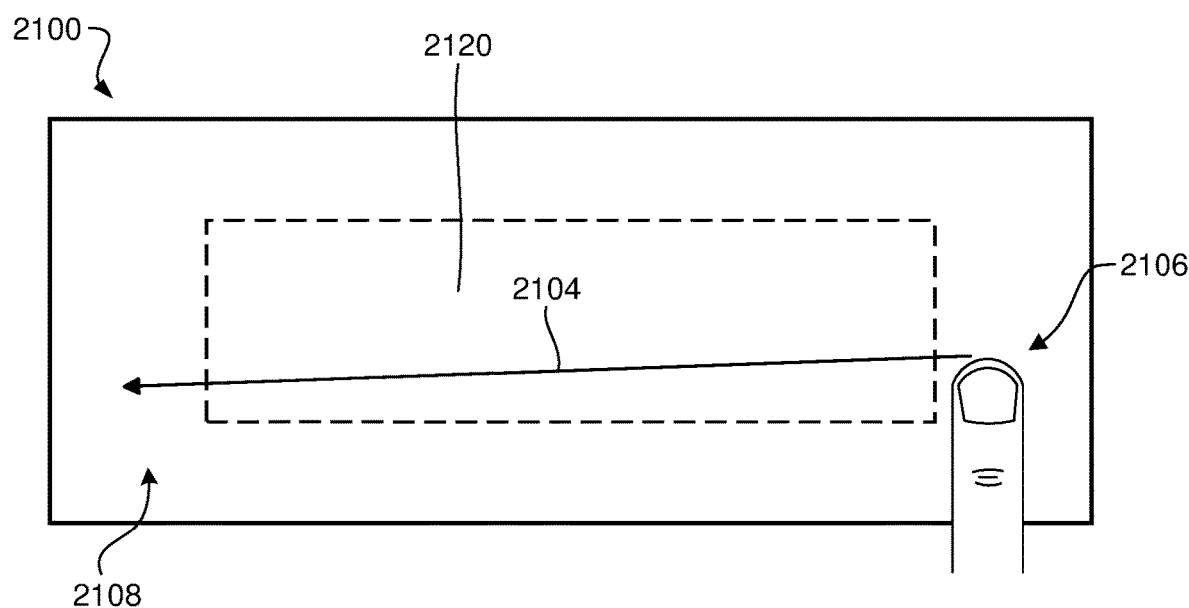
FIG. 21 depicts an example of a trigger event in accordance with the disclosure.

FIG. 21 depicts an example of a touch pad 2100. In this example, the object 2102 is a finger. The finger 2102 starts at position 2106 within region 2108 and moves along path 2104, leaving region 2108, moving a distance across the length of the touchpad, and reentering region 2108. In this example, detection of reentering the predefined region 2208 may be classified as a trigger event. In this example, the predefined region 2108 is a single continuous region that is adjacent each of the edges of the touch surface. In this example, the central portion 2120 of the touch surface may be an area that is more common for users to move their fingers or other objects when providing input to move the cursor. In such an example, the peripheral predefined region 2108 may be those areas that are less common for users to move their fingers unless the cursor-to-object speed relationship is off.

Figure 22:
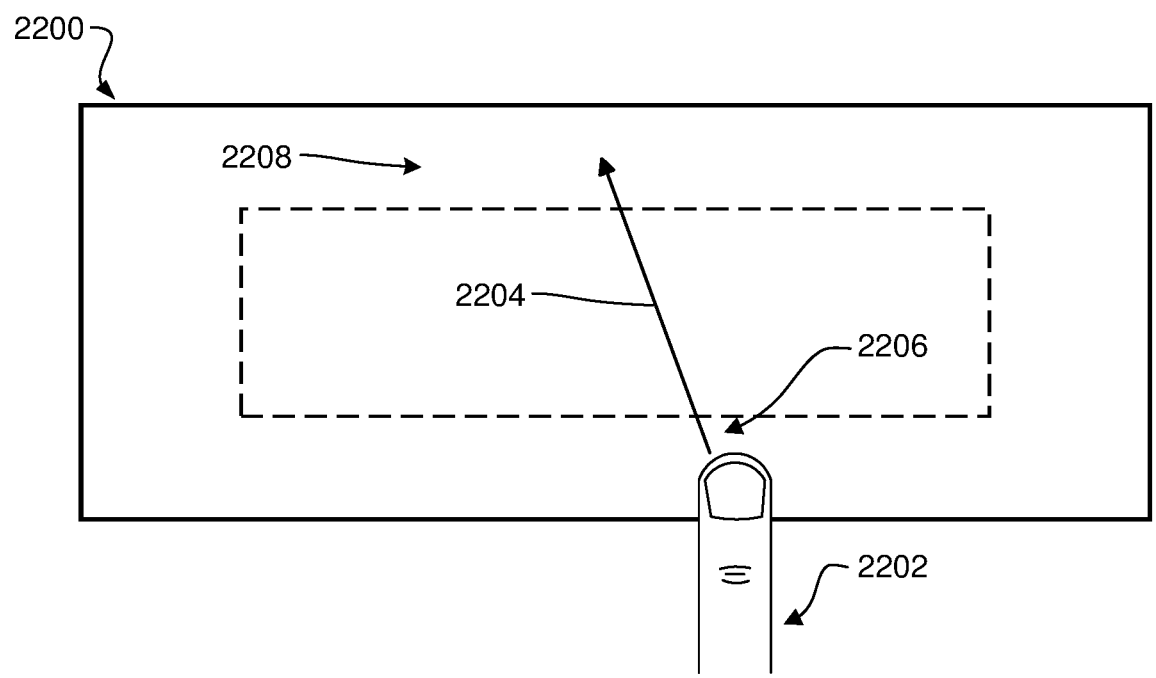
FIG. 22 depicts an example of a trigger event in accordance with the disclosure.

FIG. 22 depicts an example of a touch pad 2200. In this example, the object 2202 is a finger. The finger 2202 starts at position 2206 within the predefined region 2208 and moves along path 2204, leaving region 2208, moving a distance across the width of the touchpad, and reentering region 2208. In this example, the detection of the finger reentering the predefined regions may be classified as a trigger event.

Figure 23:
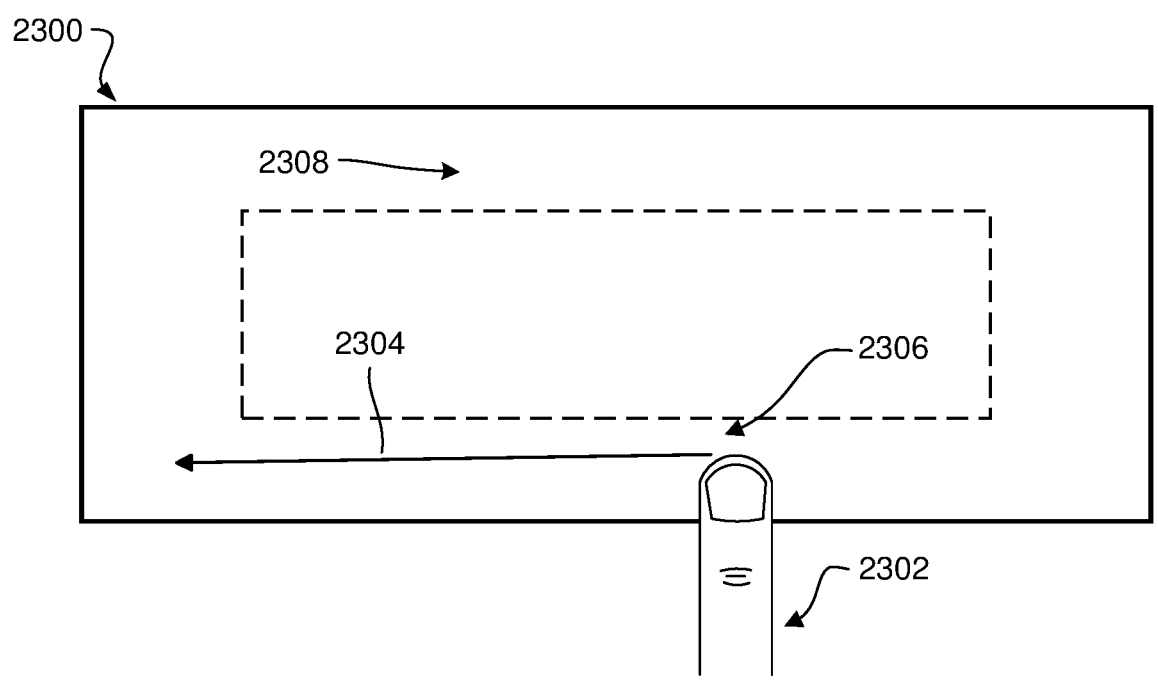
FIG. 23 depicts an example of a trigger event in accordance with the disclosure.

FIG. 23 depicts an example of a touch pad 2300. In this example, the object 2302 is a finger. The finger 2302 starts at position 2306 within the predefined region 2308 and moves along path 2304, remaining in region 2308, moving a distance across the width of the touchpad, and ending in the predefined region 2308. In this example, ending the input within the predefined region may be classified as a trigger event. In such an example, movement of the object did not result in the object leaving the predefined region, but the user input still resulted in the object's movement ending in the predefined region.

Figure 24:
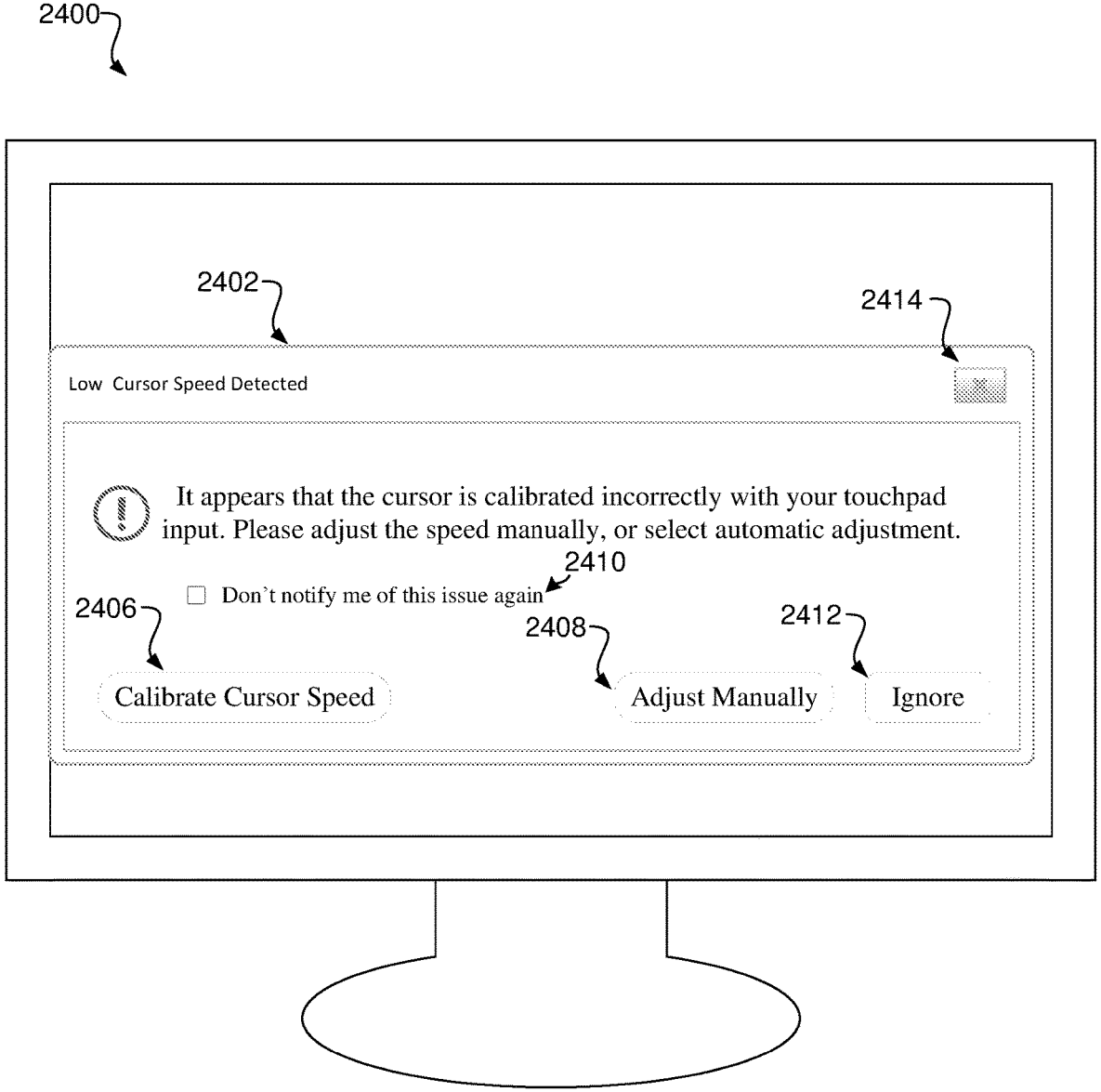
FIG. 24 depicts an example of a dialog box in response to a trigger event in accordance with the disclosure.

FIG. 24 depicts an example of a display 2400 with a dialog box 2402. In some examples, the dialog box 2402 may open due to a trigger event as defined in this disclosure. A message 2404 may ask the user if the user would like to change the cursor-to-object speed relationship. The dialog box 2402 may include options for how the user can respond to the dialog box 2402. Button 2406 may allow the user to select a calibration process that, in some examples, may automatically recalibrate the cursor-to-object speed relationship. Button 2408 may allow the user to adjust their cursor-to-object speed relationship manually. Button 2412 and button 2414 may allow the user to ignore the trigger event and maintain the current cursor-to-object speed relationship. Checkbox 2410 may allow the user to turn off the response to a detection of a trigger event so that the system will no longer open dialog box 2402 in response to a detected trigger event as defined in this disclosure. While this example includes a dialog box to communication options to the user in response to detecting a trigger event, in other examples, the message may be communicated in other ways. For example, the message may be sent by email, text message, a prompt to a user account or personal device, broadcasted with a speaker device, communicated with an illuminated icon, communicated another way, or combinations thereof.

Figure 25:
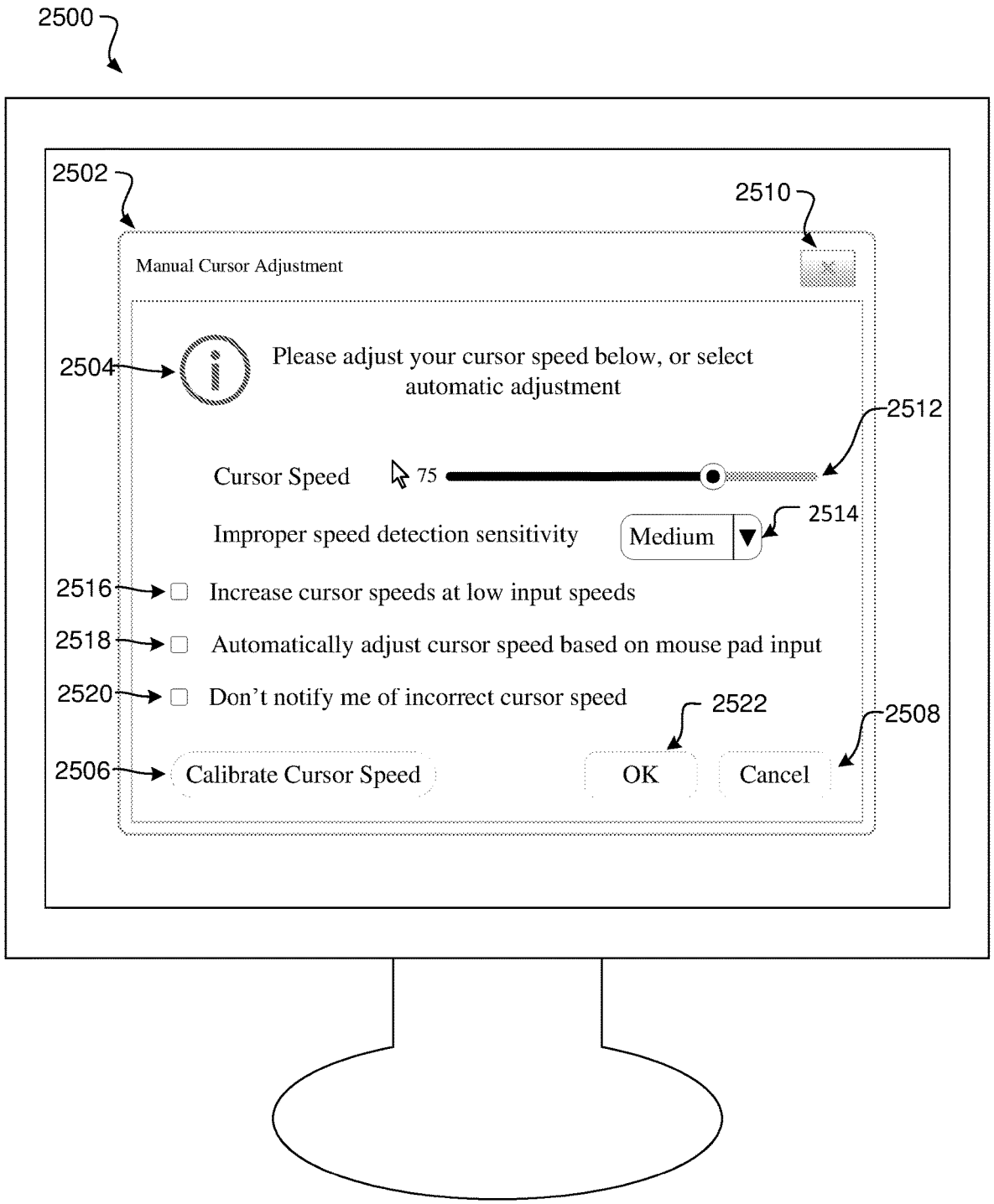
FIG. 25 depicts an example of a dialog box in response to a trigger event in accordance with the disclosure.

FIG. 25 depicts an example of a display 2500 with a dialog box 2502. In some examples, this dialog box opened in response to a user choosing to manually adjust the cursor-to-object speed relationship after being prompted. Message 2504 asks the user to manually change the cursor speed or select automatic adjustment. Button 2506 may allow the user to select a calibration process that, in some examples, will automatically recalibrate the cursor-to-object speed relationship. Buttons 2508 and 2510 may allow the user to ignore the trigger event and maintain the current cursor-to-object speed relationship. Checkbox 2520 may allow the user to turn off the response to a detection of a trigger event so that the system will no longer open a dialog box in response to a detected trigger event as defined in this disclosure. Slider 2512 may allow the user to manually adjust the cursor-to-object speed relationship. Dropdown menu 2514 may allow the user to adjust the threshold for how many trigger events need to be detected before changing the cursor-to-object speed relationship. Checkbox 2516 may allow the user to increase the cursor-to-object speed relationship in the lower object speed range. Checkbox 2518 may allow the user to allow the system to automatically adjust cursor-to-object speed relationship in real time based on detected trigger events. Button 2522 may allow the user to save changes to the cursor speed settings.

Figure 26:
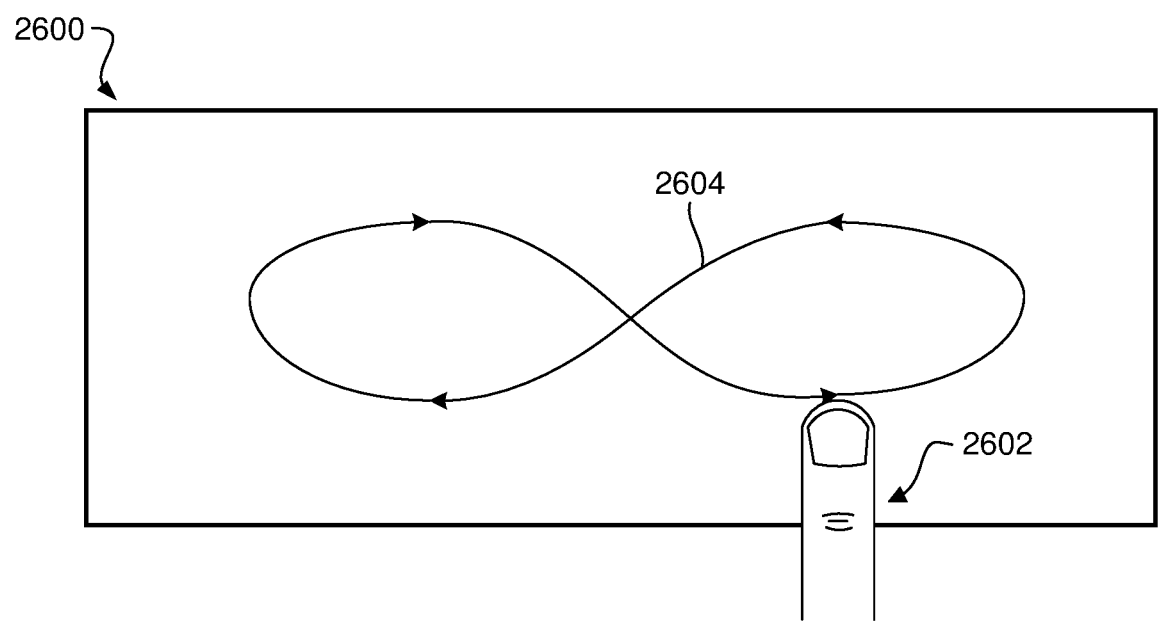
FIG. 26 depicts an example of a touchpad calibration method in accordance with the disclosure.

FIG. 26 depicts an example of a touchpad 2600. In this example, the object 2602 is a finger. The user may be instructed to move his or her finger 2602 along path 2604 on touchpad 2600. The system may use the input from the user's finger movement to determine at least one parameter of a personalized cursor-to-object speed relationship. In some examples, this gesture on the touchpad may allow for calibration of the cursor-to-object speed relationship. In some examples, the user may be asked to perform this movement in response to a trigger event has been detected and the current cursor-to-object speed relationship is incorrect. While this example has been depicted with an example of a figure eight as the pattern for the user to follow, in other examples, the calibration pattern may include any appropriate type of pattern for the user to follow. In yet other examples, the system may present the user with a set of instructions to help calibrate the cursor-to-object speed relationship.

Figure 27:
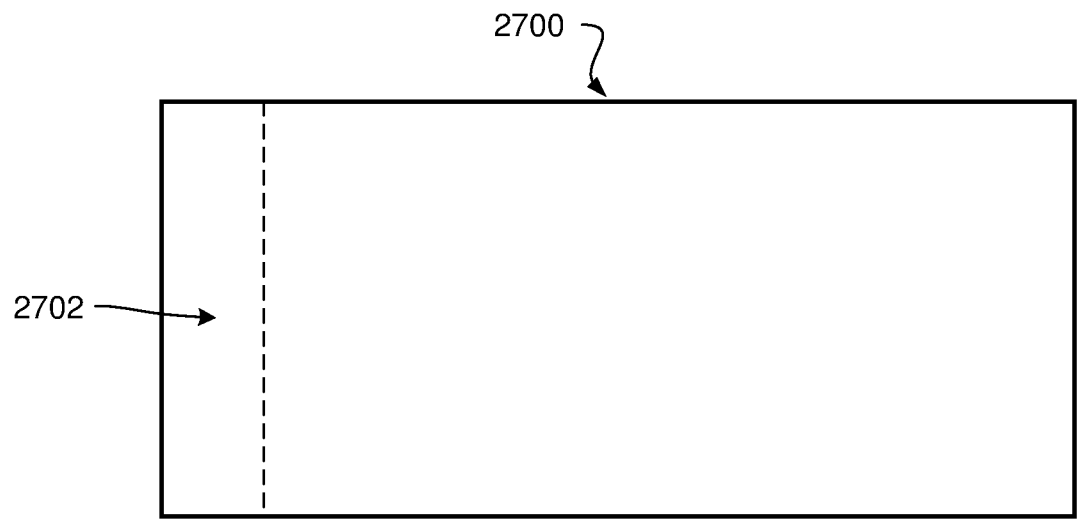
FIG. 27 depicts an example of a touchpad with a predefined region in accordance with the disclosure.

FIG. 27 depicts an example of a touch pad 2700 with a predefined region 2702 used to detect a trigger event. In this example, the predefined region is on only one side of the touch pad. In some examples, the predefined region may be on a single side, multiple sides, a subset of side where the subset is less than all the side, or combinations thereof.

Figure 28:
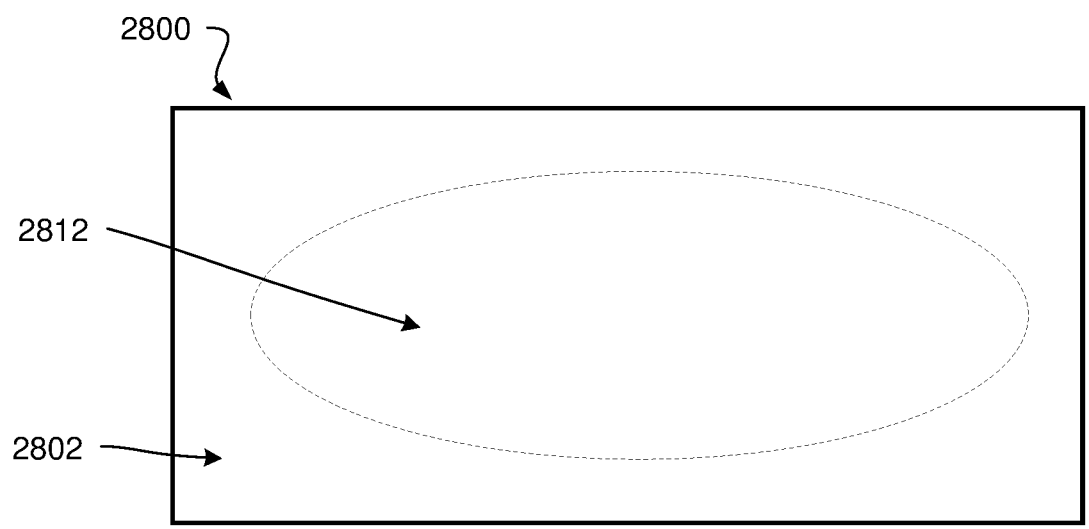
FIG. 28 depicts an example of a touchpad with a predefined region in accordance with the disclosure.

FIG. 28 depicts an example of a touch pad 2800 with a predefined region 2802. In this example, the width of the defined area may be variable along the length of the predefined area. The central region 2812 that is outside of the predefined region 2802 may form a circular shape, a square shape, a triangular shape, a symmetric shape, an asymmetric shape, another kind of shape, or combinations thereof.

Figure 29:
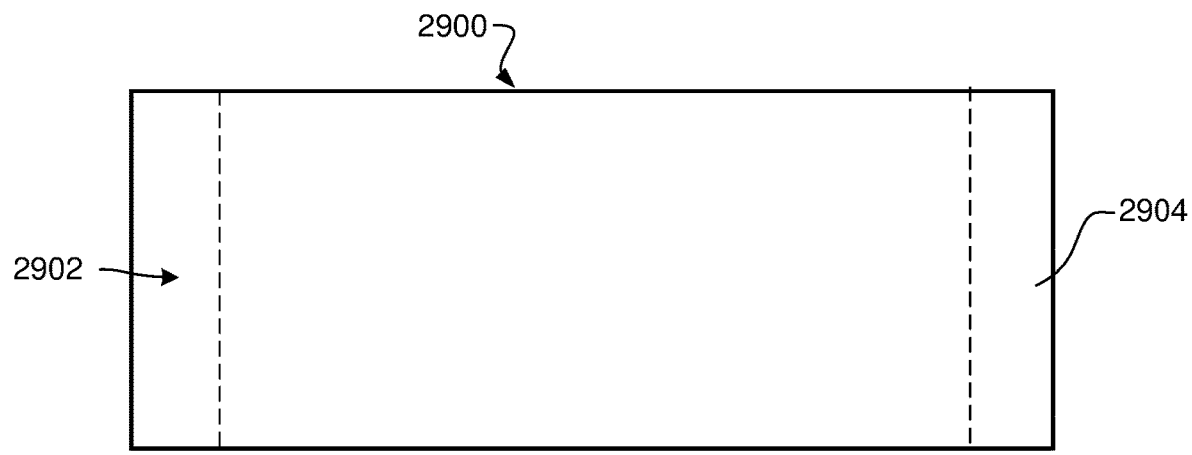
FIG. 29 depicts an example of a touchpad with a predefined region in accordance with the disclosure.

FIG. 29 depicts an example of a touch pad 2900 with two regions 2902 and 2904 which are not connected. In some examples, regions 2902 and 2904 are both predefined regions and entering either may produce a trigger event as defined in this disclosure.

Figure 30:
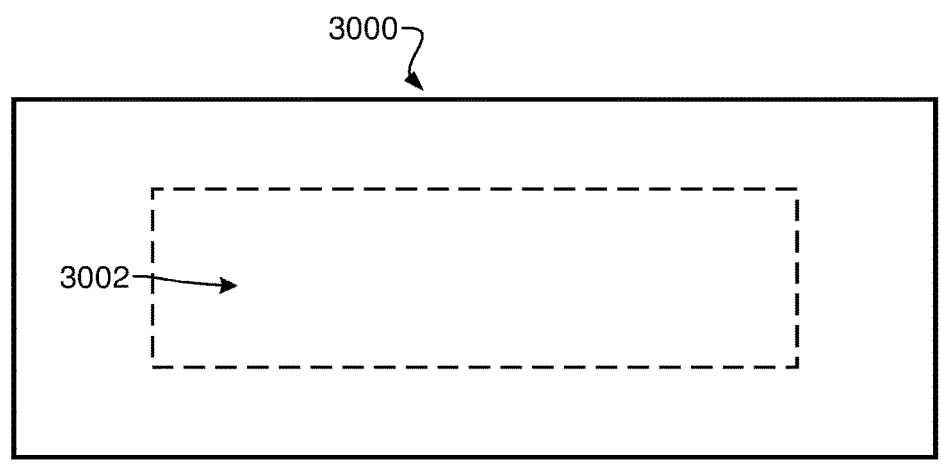
FIG. 30 depicts an example of a touchpad with a predefined region in accordance with the disclosure.

FIG. 30 depicts an example of a touch pad 3000 with a central predefined region 3002. In some examples, region 3002 is the predefined region which must be entered to produce a trigger event as defined in this disclosure.

Figure 31:
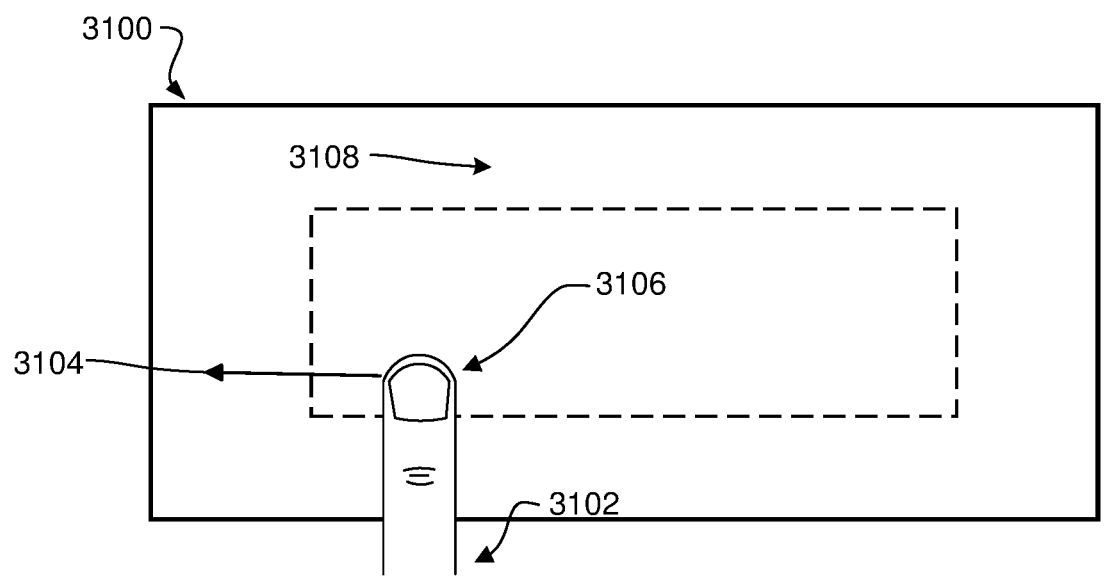
FIG. 31 depicts an example of a trigger event in accordance with the disclosure.

FIG. 31 depicts an example of a touch pad 3100. In this example, the object 3102 is a finger. The finger 3102 starts at position 3106 close to predefined region 3108 and moves along a relatively short path 3104 before entering predefined region 3108. In this example, movement along path 3104 is detected as a trigger event since the object is moving into a predefined region.

Figure 32:
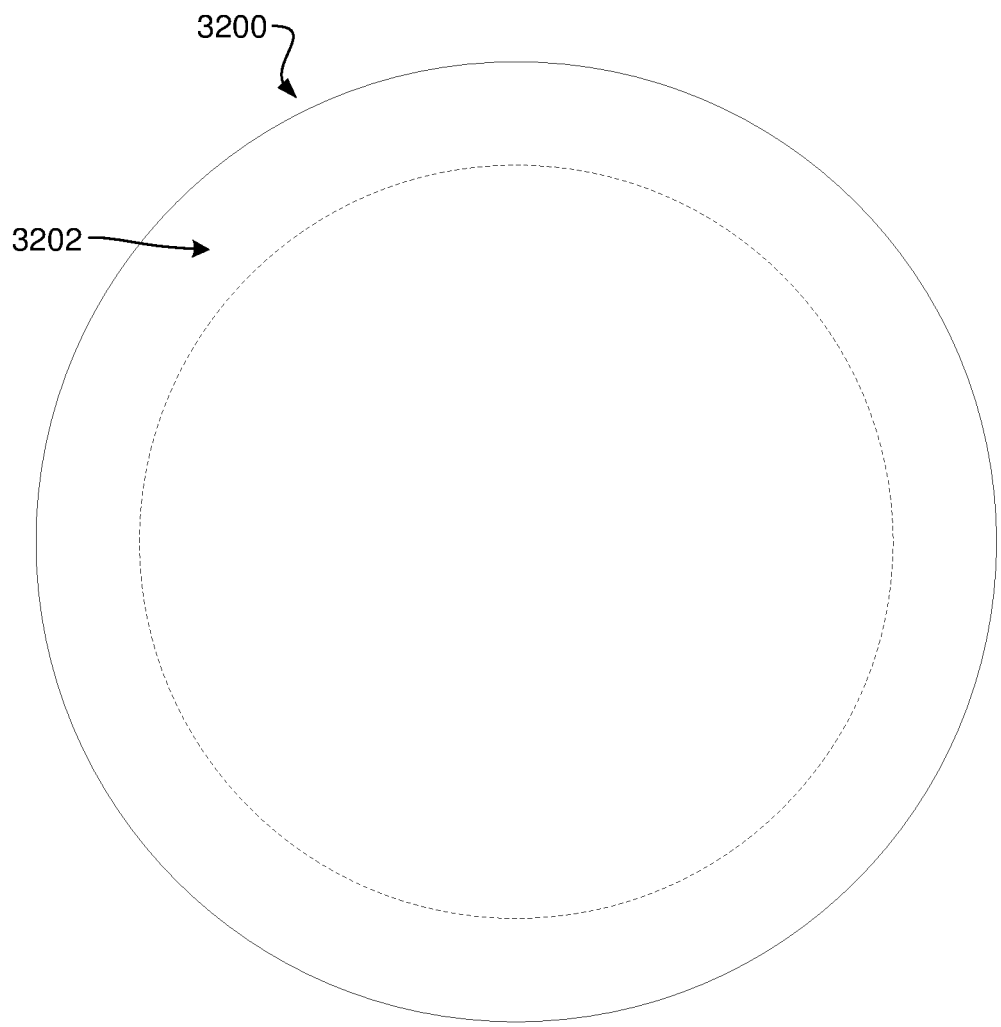
FIG. 32 depicts an example of a touchpad with a predefined region in accordance with the disclosure.

FIG. 32 depicts an example of a touch pad 3200 with a predefined region 3202 that is incorporated into circular touch pad. In this example, the predefined region 3202 is a peripheral ring. While the examples of touch pads above have been depicted as having generally rectangular or generally circular shapes, the touch pads may include any appropriate shape. A non-exhaustive list of appropriate shapes may include generally square shapes, generally ovular shapes, generally symmetric shapes, generally asymmetric shapes, another appropriate shape, or combinations thereof.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A system for adjusting a cursor speed, comprising:
a sensor with at least one capacitance sense electrode;
a controller in communication with the sensor;
memory in communication with the controller; and
programmed instructions stored in the memory and configured, when executed, to cause the capacitance controller to:
detect movement of an object moving proximate the sensor at an object speed;
apply a cursor speed to a cursor depicted in a display based at least in part on a cursor-to-object speed relationship;
detect a trigger event in the detected object movement; and
change the cursor-to-object speed relationship in response to detecting the trigger event;
wherein the trigger event includes detecting the object in a predefined region of the sensor.

2. The system of claim 1, wherein the cursor-to-object speed relationship includes at least:
a lower object speed range; and
an upper object speed range;
wherein a first curser speed mapped to the lower object speed range is slower than a second cursor speed mapped to the upper object speed range.

3. The system of claim 2, wherein changing the cursor-to-object speed relationship in response to detecting the trigger event includes adjusting the cursor-to-object speed relationship by an intensity factor, wherein the intensity factor is based, at least in part, on an average speed of the object's movement along its path.

4. The system of claim 2, wherein changing the cursor-to-object speed relationship in response to detecting the trigger event includes adjusting the cursor-to-object speed relationship by an intensity factor, wherein the intensity factor is based, at least in part, on distance traveled of the object entering the predefined region.

5. The system of claim 2, wherein changing the cursor-to-object speed relationship includes increasing the first cursor speed in the lower object speed range and increasing the second cursor speed in the upper object speed range.

6. The system of claim 2, wherein changing the cursor-to-object speed relationship includes increasing the first cursor speed in the lower object speed range and maintaining the second cursor speed in the upper object speed range.

7. The system of claim 1, wherein the predefined region is an area adjacent to the edge of the sensor.

8. The system of claim 7, wherein the predefined region is within at least 20% of the length of the sensor.

9. The system of claim 8, wherein the predefined region is within at least 20% of the width of the sensor.

10. The system of claim 1, wherein the predefined region is peripherally located adjacent to the edge of the sensor; wherein a central region of the sensor is outside of the predefined region.

11. The system of claim 1, wherein the trigger event includes detecting movement of the object into the predefined region from an area of the sensor outside of the predefined region.

12. The system of claim 1, wherein the trigger event includes detecting the object lift off the sensor within the predefined region.

13. The system of claim 1, wherein the trigger event includes detecting movement of the object across more than 50% of a dimension of the sensor.

14. The system of claim 1, wherein changing the cursor-to-object speed relationship in response to detecting the trigger event includes detecting the trigger event at least twice in the same direction within a predetermined amount of time.

15. The system of claim 1, wherein changing the cursor-to-object speed relationship in response to detecting the trigger event includes sending a user prompt to change the cursor speed.

16. The system of claim 1, wherein the trigger event includes detecting movement of the object across more than 50% of a dimension of the sensor into the predefined region from an area of the sensor outside of the predefined region, and detecting the object lift off the sensor within the predefined region.

17. A computer-program product for adjusting a cursor speed, the computer-program product comprising a non-transitory computer-readable medium storing instructions executable by a processor to:
  detect movement of an object moving proximate a touch sensor at an object speed;
  apply a cursor speed to a cursor depicted in a display based at least in part on a cursor-to-object speed relationship;
  detect a trigger event in the detected object movement; and
  change the cursor-to-object speed relationship in response to detecting the trigger event;
  wherein the trigger event includes detecting the object in a predefined region of the sensor.

18. The computer-program product of claim 17, wherein the predefined region is an area adjacent to the edge of the sensor.

19. The computer-program product of claim 18, wherein changing the cursor-to-object speed relationship in response to detecting the trigger event includes detecting the trigger event at least twice in the same direction within a predetermined amount of time.

20. A method of adjusting a cursor speed, comprising:
  detecting movement of an object moving proximate a touch sensor at an object speed;
  applying a cursor speed to a cursor depicted in a display based at least in part on a cursor-to-object speed relationship;
  detecting a trigger event in the detected object movement; and
  changing the cursor-to-object speed relationship in response to detecting the trigger event;
  wherein the trigger event includes detecting the object in a predefined region of the sensor.

* * * * *